US011212555B2

United States Patent
Auyeung et al.

(10) Patent No.: US 11,212,555 B2
(45) Date of Patent: Dec. 28, 2021

(54) METHOD OF REDUCING CONTEXT MODELS FOR ENTROPY CODING OF TRANSFORM COEFFICIENT SIGNIFICANT FLAG

(71) Applicant: Tencent America LLC, Palo Alto, CA (US)

(72) Inventors: Cheung Auyeung, Sunnyvale, CA (US); Xin Zhao, Santa Clara, CA (US); Xiang Li, Saratoga, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 16/904,000

(22) Filed: Jun. 17, 2020

(65) Prior Publication Data

US 2020/0404328 A1    Dec. 24, 2020

Related U.S. Application Data

(60) Provisional application No. 62/863,742, filed on Jun. 19, 2019.

(51) Int. Cl.
*H04N 19/60* (2014.01)
*H04N 19/124* (2014.01)
(Continued)

(52) U.S. Cl.
CPC .......... *H04N 19/60* (2014.11); *H04N 19/124* (2014.11); *H04N 19/136* (2014.11);
(Continued)

(58) Field of Classification Search
CPC ...... H04N 19/60; H04N 19/91; H04N 19/124; H04N 19/18; H04N 19/176; H04N 19/70; H04N 19/136
See application file for complete search history.

(56) References Cited

U.S. PATENT DOCUMENTS

2014/0003529 A1*  1/2014  Joshi ............... H04N 19/60
                                          375/240.18
2017/0064336 A1*  3/2017  Zhang ............ H04N 19/122
(Continued)

FOREIGN PATENT DOCUMENTS

WO    2018/149685 A1    8/2018

OTHER PUBLICATIONS

Bross et al., "Versatile Video Coding (Draft 5)", Joint Video Experts Team (JVET) of ITU-T SG 16 WP 3 and ISO/IEC JTC 1/SC 29/WG 11, 14th Meeting: Geneva, CH, Mar. 19-27, 2019, JVET-N1001 (383 pages).

(Continued)

*Primary Examiner* — Joseph Suh
(74) *Attorney, Agent, or Firm* — Oblon, McClelland, Maier & Neustadt, L.L.P.

(57) ABSTRACT

A method of video decoding performed in a video decoder includes receiving a coded video bitstream including a current picture and at least one syntax element that corresponds to transform coefficients of a transform block in the current picture. The method further includes determining an offset value based on an output of a monotonic non-decreasing f(x) function performed on a sum (x) of a group of partially reconstructed transform coefficients. The method further includes determining a context model index based on a sum of the determined offset value and a base value. The method further includes selecting, for the at least one syntax of a current transform coefficient, a context model from a plurality of context models based on the determined context model index.

14 Claims, 19 Drawing Sheets

(51) Int. Cl.
*H04N 19/18* (2014.01)
*H04N 19/176* (2014.01)
*H04N 19/70* (2014.01)
*H04N 19/136* (2014.01)
*H04N 19/91* (2014.01)

(52) U.S. Cl.
CPC ........... *H04N 19/176* (2014.11); *H04N 19/18* (2014.11); *H04N 19/70* (2014.11); *H04N 19/91* (2014.11)

(56) References Cited

U.S. PATENT DOCUMENTS

2019/0045226 A1* 2/2019 Xu ................... H04N 19/159
2019/0068967 A1* 2/2019 Ikai .................. H04N 19/159
2020/0322610 A1* 10/2020 Leleannec ........... H04N 19/157

OTHER PUBLICATIONS

Bross et al., "Versatile Video Coding (Draft 3)", Joint Video Experts Team (JVET) of ITU-T SG 16 WP 3 and ISO/IEC JTC 1/SC 29/WG 11, 12th Meeting: Macao, CN, Oct. 3-12, 2018, JVET-L1001 (233 pages).
International Search Report and Written Opinion dated Sep. 2, 2020 in corresponding PCT Application No. PCT/US20/38417 (7 pages).

* cited by examiner

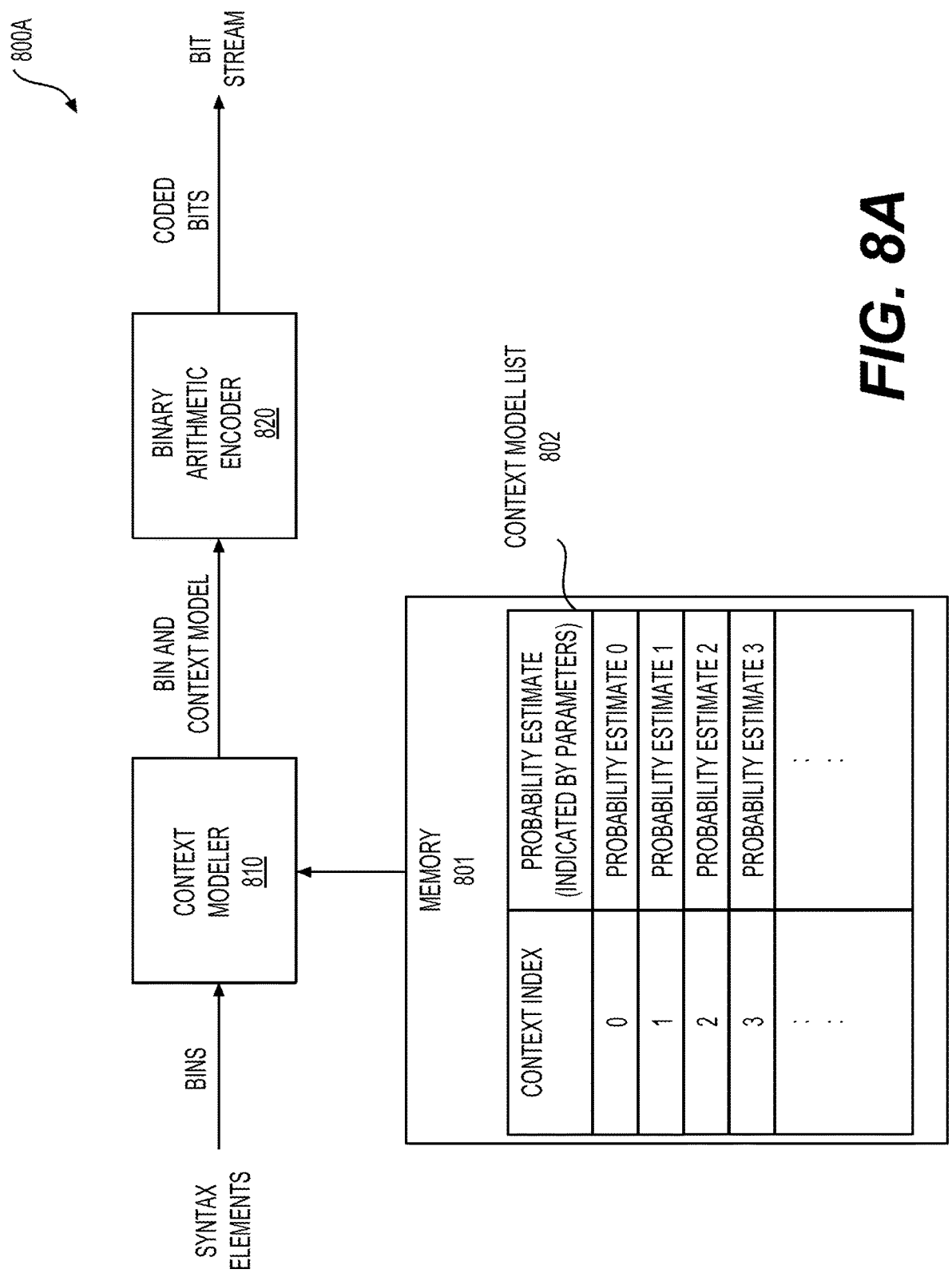

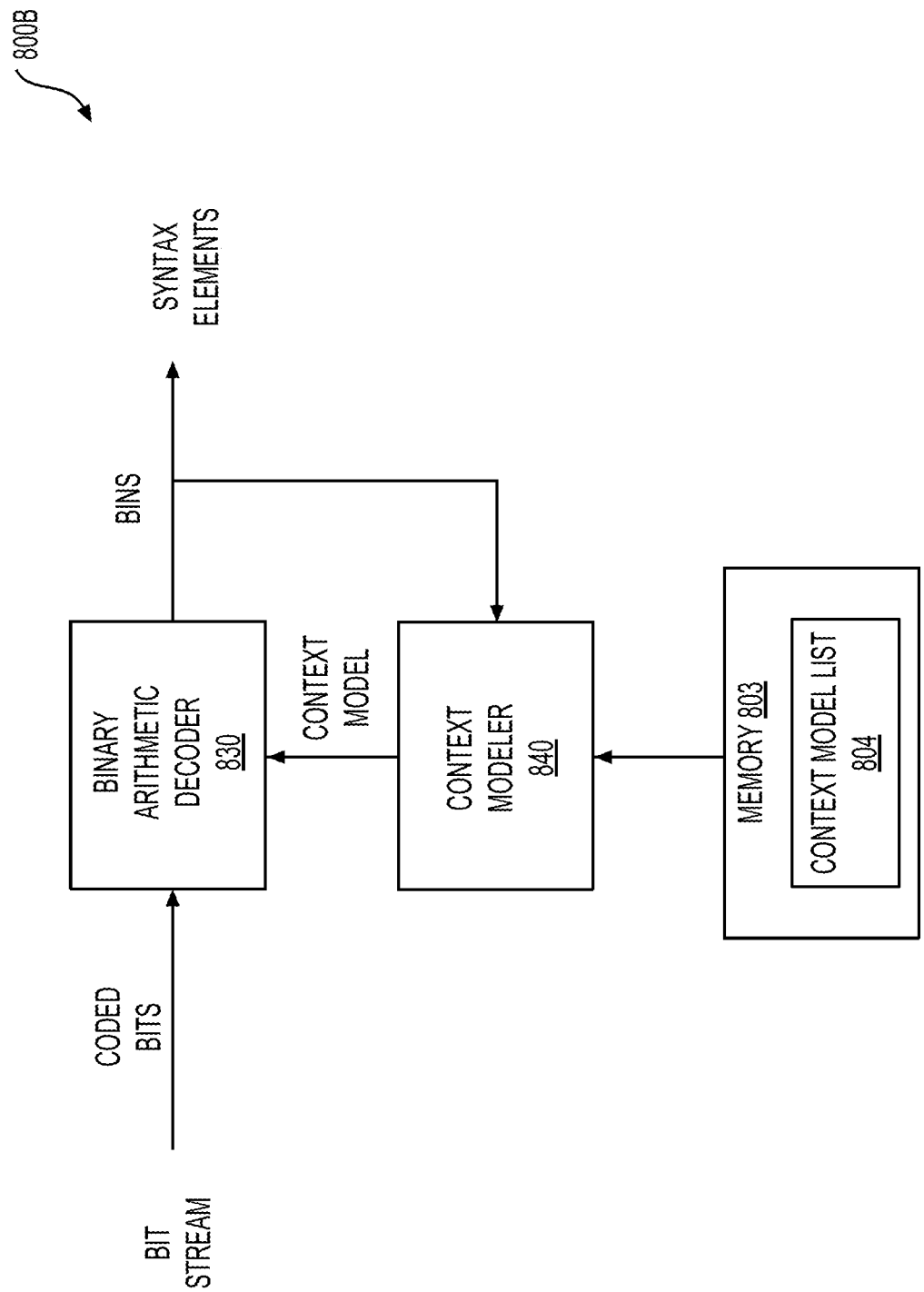

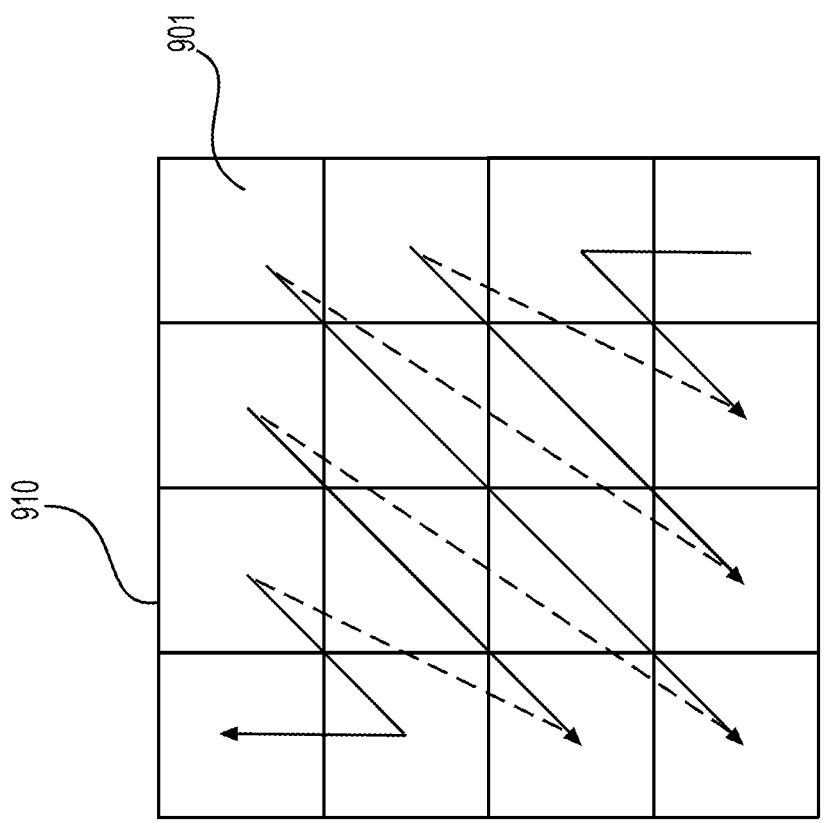

METHOD OF REDUCING CONTEXT MODELS FOR ENTROPY CODING OF TRANSFORM COEFFICIENT SIGNIFICANT FLAG

INCORPORATION BY REFERENCE

This present disclosure claims the benefit of priority to U.S. Provisional Application No. 62/863,742, "METHOD OF REDUCING CONTEXT MODELS FOR ENTROPY CODING OF TRANSFORM COEFFICIENT SIGNIFICANT FLAG" filed on Jun. 19, 2019, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

According to an exemplary embodiment, a method of video decoding performed in a video decoder includes receiving a coded video bitstream including a current picture and at least one syntax element that corresponds to transform coefficients of a transform block in the current picture. The method further includes determining an offset value based on an output of a monotonic non-decreasing f(x) function performed on a sum (x) of a group of partially reconstructed transform coefficients. The method further includes determining a context model index based on a sum of the determined offset value and a base value. The method further includes selecting, for the at least one syntax of a current transform coefficient, a context model from a plurality of context models based on the determined context model index.

According to an exemplary embodiment, a method of video decoding performed in a video decoder includes receiving a coded video bitstream including a current picture and at least one syntax element that corresponds to transform coefficients of a transform block in the current picture. The method further includes determining, for each context model region from a plurality of context model regions, an output of a monotonic non-decreasing function performed on a sum (x) of a group of partially reconstructed transform coefficients and a number of context models associated with a respective context model region. The method further includes determining a context model index based on the output of the monotonic non-decreasing function of each context model region. The method further includes selecting, for the at least one syntax of a current transform coefficient, a context model from a plurality of context models based on the determined context model index.

According to an exemplary embodiment a video decoder for video decoding includes processing circuitry configured to receive a coded video bitstream including a current picture and at least one syntax element that corresponds to transform coefficients of a transform block in the current picture. The processing circuitry is further configured to determine an offset value based on an output of a monotonic non-decreasing f(x) function performed on a sum (x) of a group of partially reconstructed transform coefficients. The processing circuitry is further configured to determine a context model index based on a sum of the determined offset value and a base value. The processing circuitry is further configured to select, for the at least one syntax of a current transform coefficient, a context model from a plurality of context models based on the determined context model index.

According to an exemplary embodiment, a video decoder apparatus for video decoding includes processing circuitry configured to receive a coded video bitstream including a current picture and at least one syntax element that corresponds to transform coefficients of a transform block in the current picture. The processing circuitry is further configured to determine, for each context model region from a plurality of context model regions, an output of a monotonic non-decreasing function performed on a sum (x) of a group of partially reconstructed transform coefficients and a number of context models associated with a respective context model region. The processing circuitry is further configured to determine a context model index based on the output of the monotonic non-decreasing function of each context model region. The processing circuitry is further configured to select, for the at least one syntax of a current transform coefficient, a context model from a plurality of context models based on the determined context model index.

BRIEF DESCRIPTION OF THE DRAWINGS

Further features, the nature, and various advantages of the disclosed subject matter will be more apparent from the following detailed description and the accompanying drawings in which:

FIG. 8A shows an exemplary context-based adaptive binary arithmetic coding (CABAC) based entropy encoder in accordance with an embodiment.

FIG. 8B shows an exemplary CABAC based entropy decoder in accordance with an embodiment.

FIG. 9 shows an example of a sub-block scan order in accordance with an embodiment.

DETAILED DESCRIPTION OF EMBODIMENTS

Figure 1:
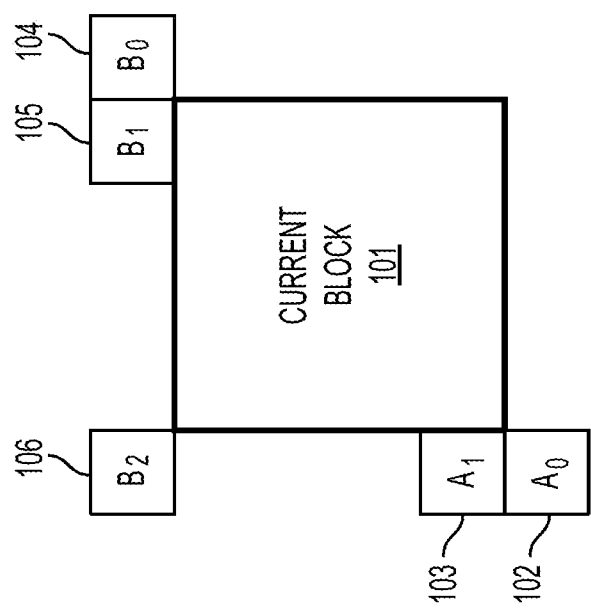
FIG. 1 is a schematic illustration of a current block and its surrounding spatial merge candidates in one example.
Figure 2:
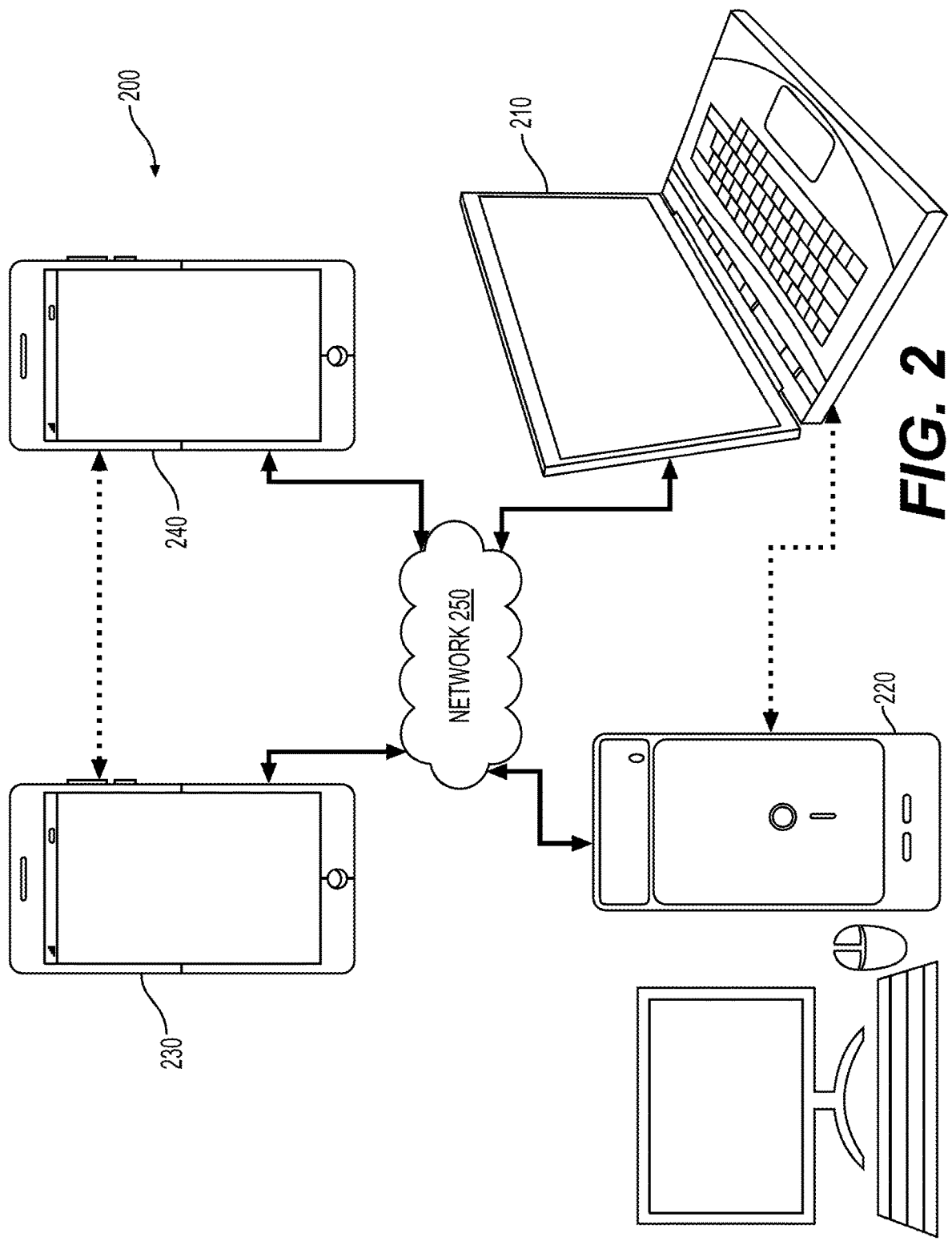
FIG. 2 is a schematic illustration of a simplified block diagram of a communication system in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
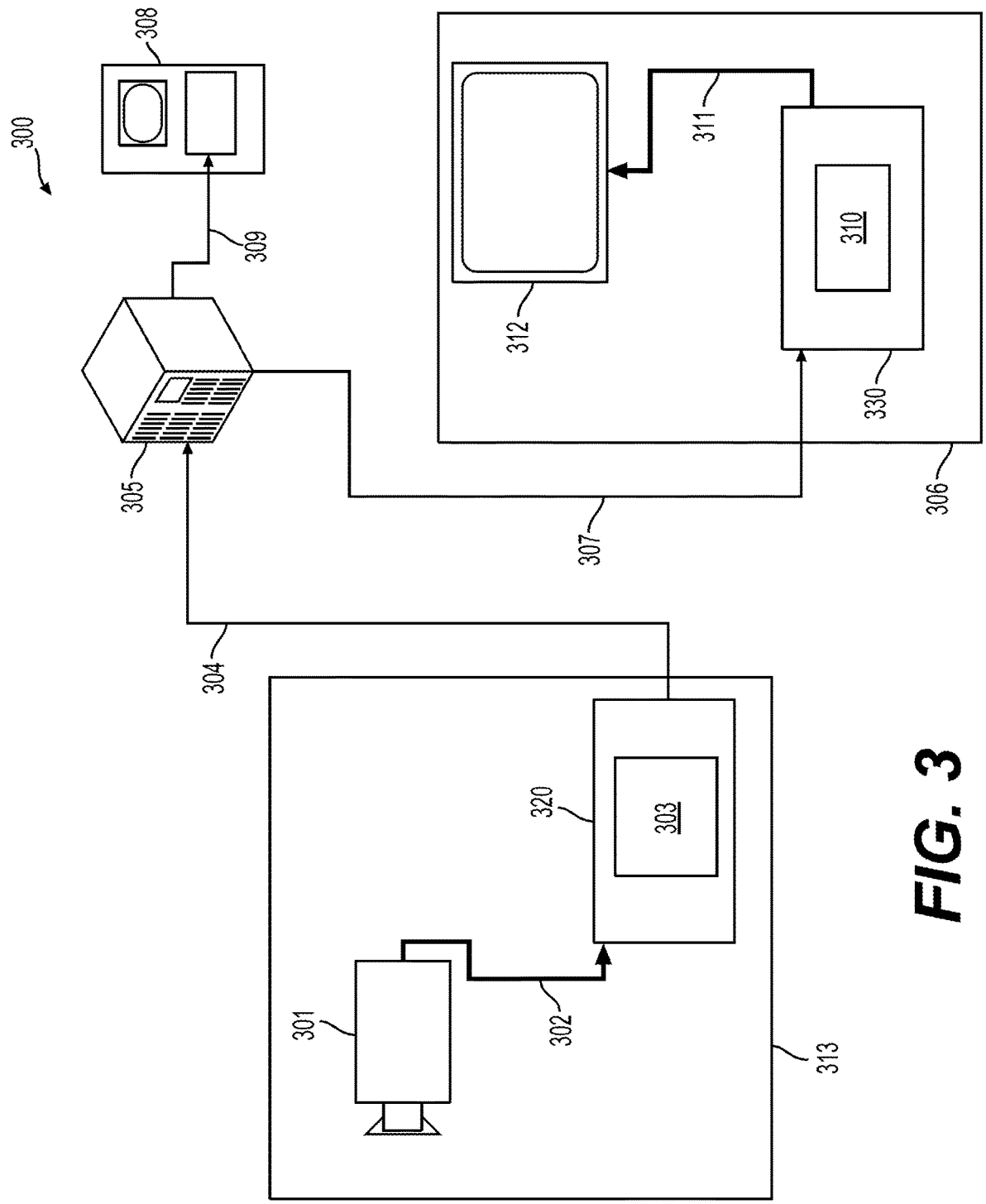
FIG. 3 is a schematic illustration of a simplified block diagram of a communication system in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
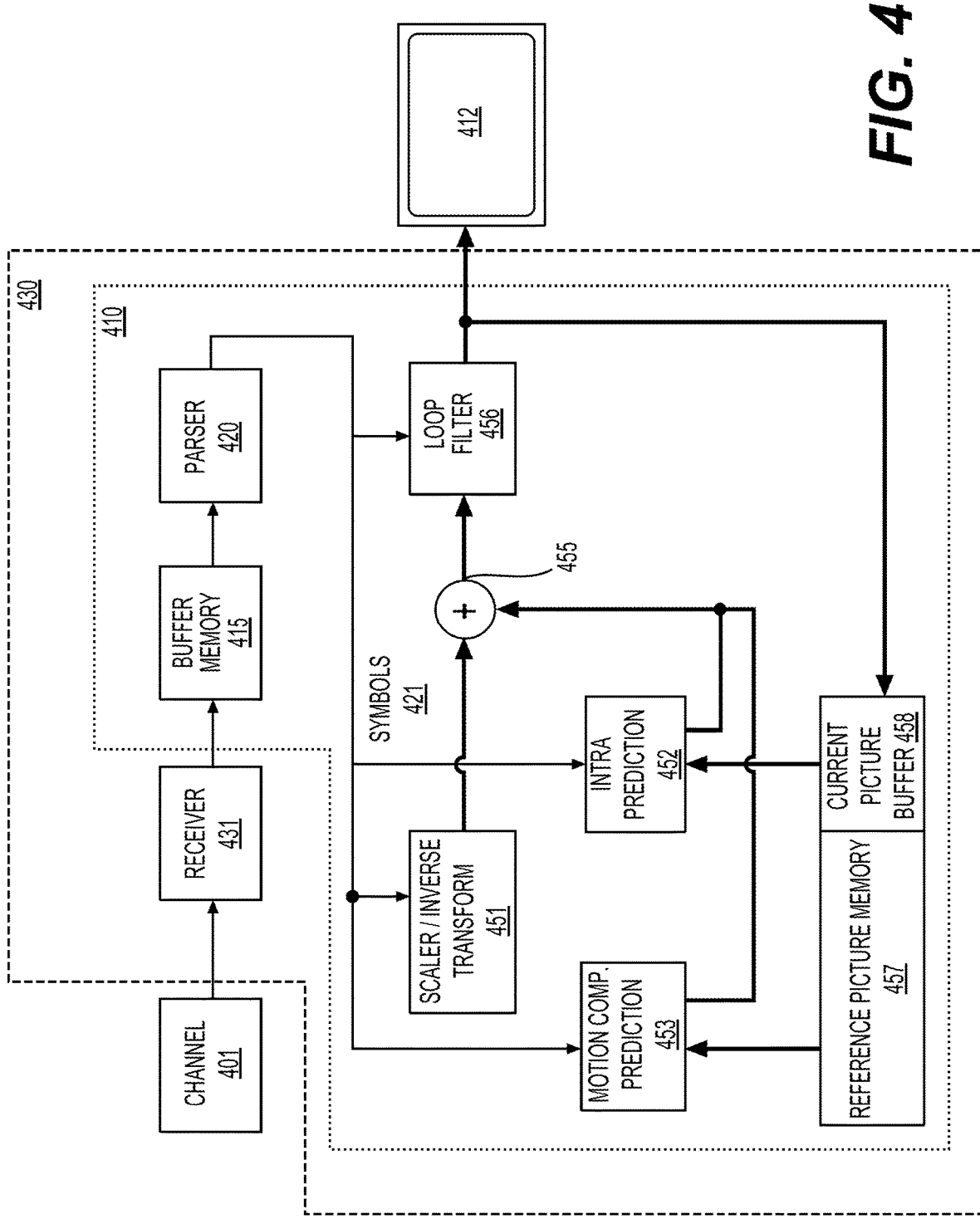
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
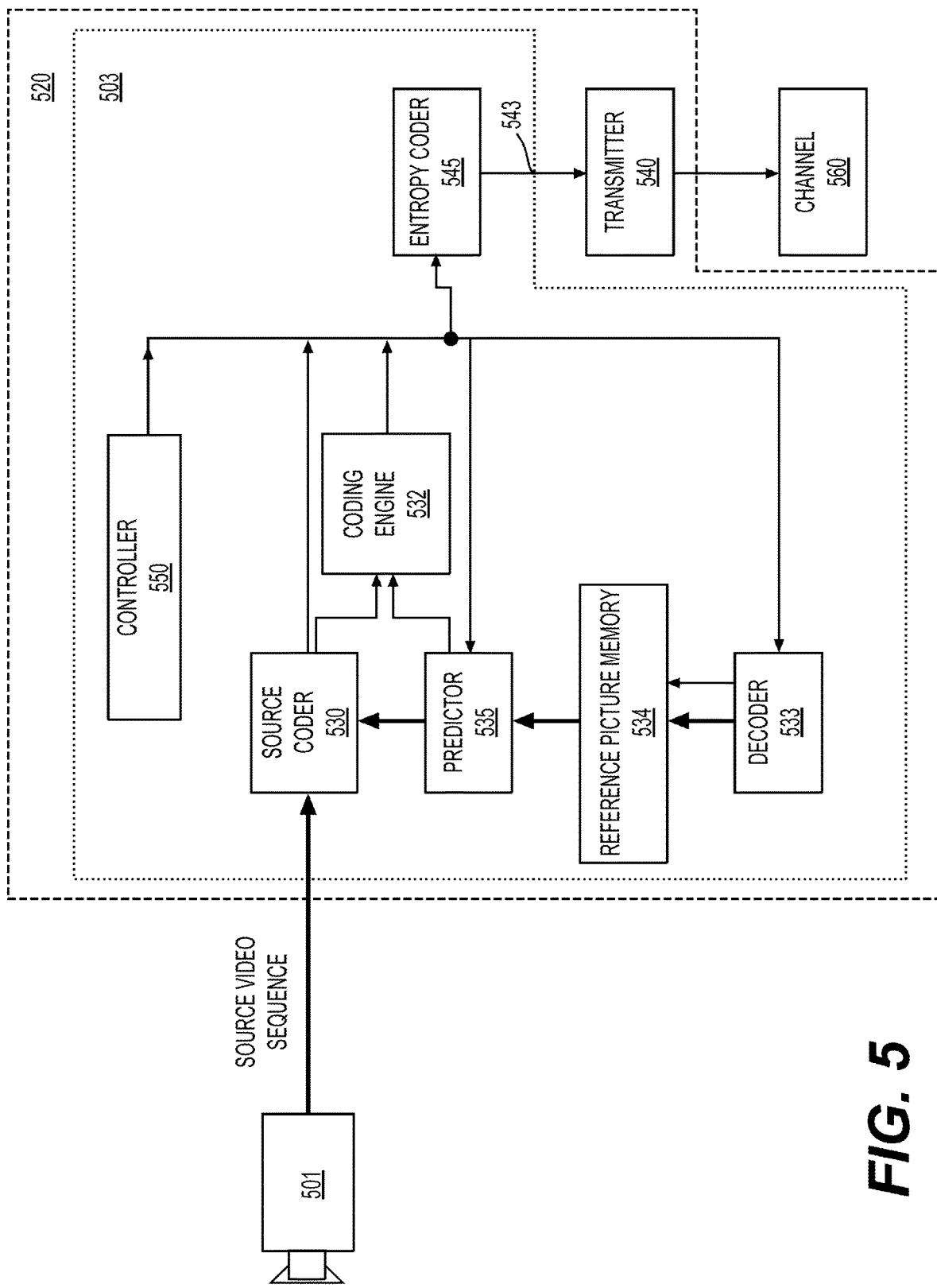
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
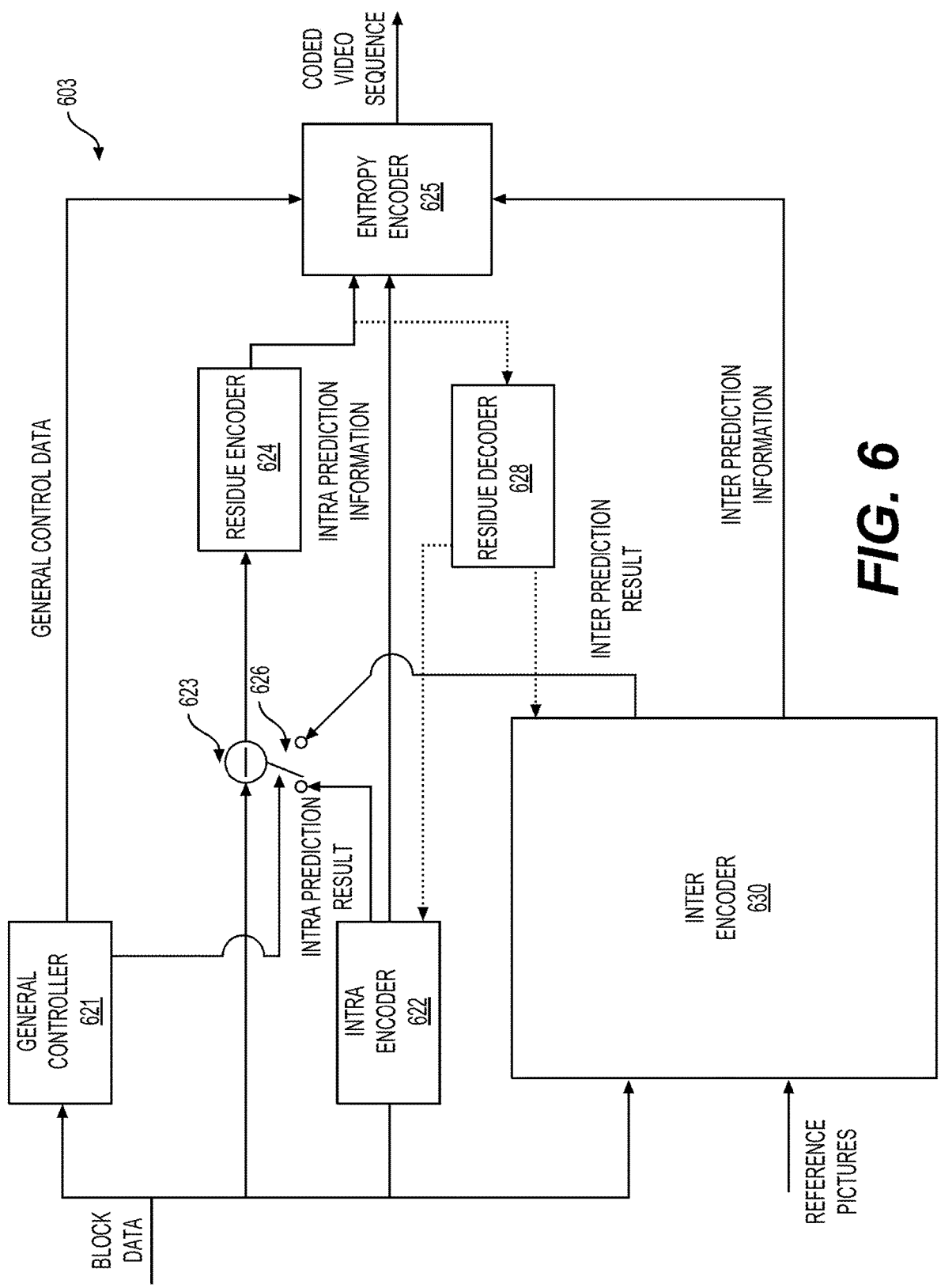
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
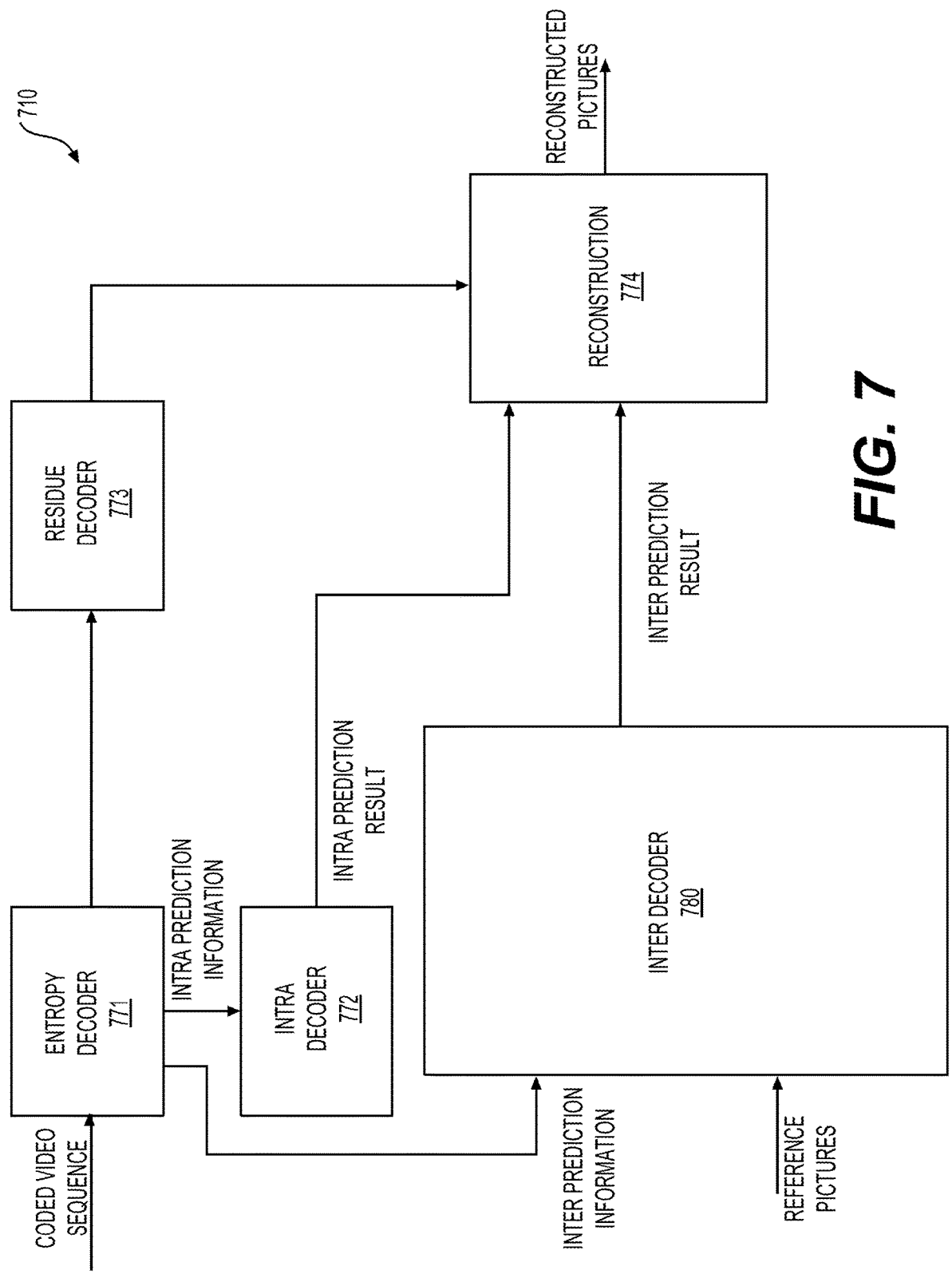
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (603), and the video decoders (310), (410), and (710) can be implemented using one or more processors that execute software instructions.

Entropy coding can be performed at a last stage of video coding (or a first stage of video decoding) after a video signal is reduced to a series of syntax elements. Entropy coding can be a lossless compression scheme that uses statistic properties to compress data such that a number of bits used to represent the data is logarithmically proportional to the probability of the data. For example, by performing entropy coding over a set of syntax elements, bits representing the syntax elements (referred to as bins) can be converted to fewer bits (referred to as coded bits) in a bit stream. Context-based adaptive binary arithmetic coding (CABAC) is one form of entropy coding. In CABAC, a context model providing a probability estimate can be determined for each bin in a sequence of bins based on a context associated with the respective bin. Subsequently, a binary arithmetic coding process can be performed using the probability estimates to encode the sequence of bins to coded bits in a bit stream. In addition, the context model is updated with a new probability estimate based on the coded bin.

FIG. 8A shows an exemplary CABAC based entropy encoder (800A) in accordance with an embodiment. For example, the entropy encoder (800A) can be implemented in the entropy coder (545) in the FIG. 5 example, or the entropy encoder (625) in the FIG. 6 example. The entropy encoder (800A) can include a context modeler (810) and a binary arithmetic encoder (820). In an example, various types of syntax elements are provided as input to the entropy encoder (800A). For example, a bin of a binary valued syntax element can be directly input to the context modeler (810), while a non-binary valued syntax element can first be binarized to a bin string before bins of the bin string are input to the context modeler (810).

In an example, the context modeler (810) receives bins of syntax elements, and performs a context modeling process to select a context model for each received bin. For example, a bin of a binary syntax element of a transform coefficient in a transform block is received. A context model can accordingly be determined for this bin based, for example, on a type of the syntax element, a color component type of the transform component, a location of the transform coefficient, and previously processed neighboring transform coefficients, and the like. The context model can provide a probability estimate for this bin.

In an example, a set of context models can be configured for each type of syntax elements. Those context models can be arranged in a context model list (802) that is stored in a memory (801) as shown in FIG. 8A. Each entry in the context model list (802) can represent a context model. Each context model on the list can be assigned an index, referred to as a context model index, or context index. In addition, each context model can include a probability estimate, or parameters indicating a probability estimate. The probability estimate can indicate a likelihood of a bin being 0 or 1. For example, during the context modeling, the context modeler (810) can calculate a context index for a bin, and a context model can accordingly be selected according to the context index from the context model list (802) and assigned to the bin.

Moreover, probability estimates in the context model list can be initialized at the start of the operation of the entropy encoder (800A). After a context model on the context model list (802) is assigned to a bin and used for encoding the bin, the context model can subsequently be updated according to a value of the bin with an updated probability estimate.

In an example, the binary arithmetic encoder (820) receives bins and context models (e.g., probability estimates) assigned to the bins, and accordingly performs a binary arithmetic coding process. As a result, coded bits are generated and transmitted in a bit stream.

FIG. 8B shows an exemplary CABAC based entropy decoder (800B) in accordance with an embodiment. For example, the entropy decoder (800B) can be implemented in the parser (420) in the FIG. 4 example, or the entropy decoder (771) in the FIG. 7 example. The entropy decoder (800B) can include a binary arithmetic decoder (830), and a context modeler (840). The binary arithmetic decoder (830) receives coded bits from a bit stream, and performs a binary arithmetic decoding process to recover bins from the coded bits. The context modeler (840) can operate similarly to the context modeler (810). For example, the context modeler (840) can select context models in a context model list (804) stored in a memory (803), and provide the selected context models to the binary arithmetic decoder (830). However, the context modeler (840) determines the context models based on the recovered bins from the binary arithmetic decoder (830). For example, based on the recovered bins, the context modeler (840) can know a type of a syntax element of a next to-be-decoded bin, and values of previously decoded syntax elements. That information is used for determining a context model for the next to-be-decoded bin.

In an embodiment, residual signals of a transform block are first transformed from spatial domain to frequency domain resulting in a block of transform coefficients. Then, a quantization is performed to quantize the block of transform coefficients into a block of transform coefficient levels. In various embodiments, different techniques may be used for converting residual signals into transform coefficient levels. The block of transform coefficient levels is further processed to generate syntax elements that can be provided to an entropy encoder and encoded into bits of a bit stream. In an embodiment, a process of generating the syntax elements from the transform coefficient levels can be performed in the following way.

The block of transform coefficient levels can first be split into sub-blocks, for example, with a size of 4×4 positions. Those sub-blocks can be processed according to a predefined scan order. FIG. 9 shows an example of the sub-block scan order, referred to as an inverse diagonal scan order. As shown, a block (910) is partitioned into 16 sub-blocks (901). The sub-block at the bottom-right corner is first processed, while the sub-block at the top-left corner is last processed. For a sub-block within which the transform coefficient levels are all zero, the sub-block can be skipped without processing in an example.

Figure 10:
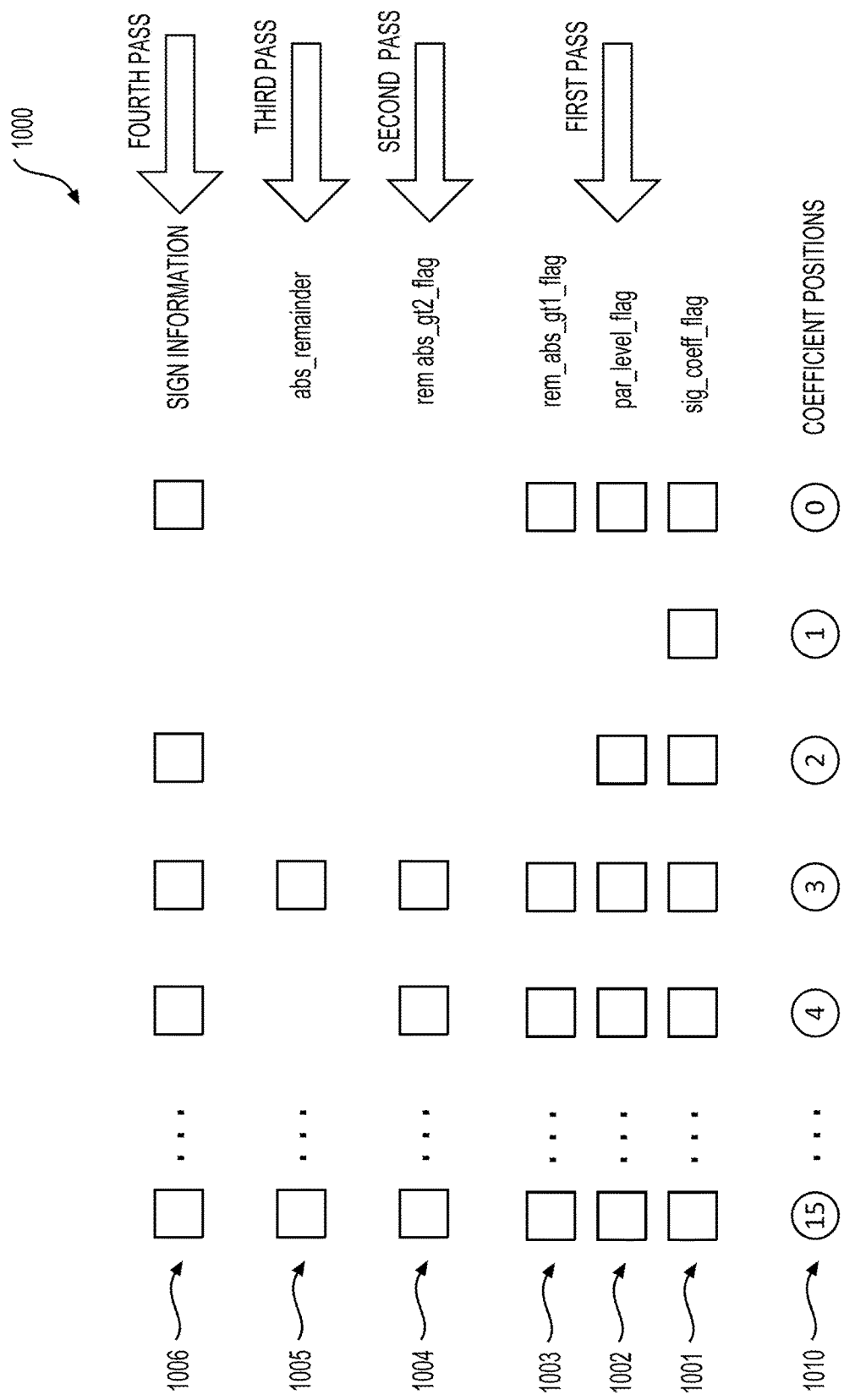
FIG. 10 shows an example of a sub-block scanning process from which different types of syntax elements of transform coefficients are generated in accordance with an embodiment.

For sub-blocks each having at least one non-zero transform coefficient level, four passes of scan can be performed in each sub-block. During each pass, the 16 positions in the respective sub-block can be scanned in the inverse diagonal scan order. FIG. 10 shows an example of a sub-block scanning process (1000) from which different types of syntax elements of transform coefficients are generated.

Sixteen coefficient positions (1010) inside a sub-block are shown in one dimension at the bottom of FIG. 10. The positions (1010) are numbered from 0 to 15 reflecting the respective scan order. During a first pass, the scan positions (1010) are scanned over, and three types of syntax elements (1001-1003) can possibly be generated at each scan position (1010):

(i) A first type of binary syntax elements (1001) (referred to as significance flags and denoted by sig_coeff_flag) indicating whether an absolute transform coefficient level of the respective transform coefficient (denoted by absLevel) is zero or larger than zero.

(ii) A second type of binary syntax elements (1002) (referred to as parity flags and denoted by par_level_flag) indicating a parity of the absolute transform coefficient level of the respective transform coefficient. The parity flags are generated only when the absolute transform coefficient level of the respective transform coefficient is non-zero.

(iii) A third type of binary syntax elements (1003) (referred to as greater 1 flags and denoted by rem_abs_gt1_flag) indicating whether (absLevel−1)>>1 is greater than 0 for the respective transform coefficient. The greater 1 flags are generated only when the absolute transform coefficient level of the respective transform coefficient is non-zero.

During a second pass, a fourth type of binary syntax elements (1004) can possibly be generated. The fourth type of syntax elements (1004) is referred to as greater 2 flags and denoted by rem_abs_gt2_flag. The fourth type of syntax elements (1004) indicates whether the absolute transform coefficient level of the respective transform coefficient is greater than 4. The greater 2 flags are generated only when (absLevel−1)>>1 is greater than 0 for the respective transform coefficient.

During a third pass, a fifth type of non-binary syntax elements (1005) can possibly be generated. The fifth type of syntax elements (1005) is denoted by abs_remainder, and indicates a remaining value of the absolute transform coefficient level of the respective transform coefficient that is greater than 4. The fifth type of syntax elements (1005) are generated only when the absolute transform coefficient level of the respective transform coefficient is greater than 4.

During a fourth pass, a sixth type of syntax elements (1006) can be generated at each scan position (1010) with a non-zero coefficient level indicating a sign of the respective transform coefficient level.

The above described various types of syntax elements (1001-1006) can be provided to an entropy encoder according to the order of the passes and the scan order in each pass. Different entropy encoding schemes can be employed for encoding different types of syntax elements. For example, in an embodiment, the significance flags, parity flags, greater 1 flags, and greater 2 flags can be encoded with a CABAC based entropy encoder, such as that described in the FIG. 8A example. In contrast, the syntax elements generated during the third and fourth passes can be encoded with a CABAC-bypassed entropy encoder (e.g., a binary arithmetic encoder with fixed probability estimates for input bins).

Context modeling can be performed to determine context models for bins of some types of transform coefficient syntax elements. In an embodiment, the context models can be determined according to a local template and a diagonal position of each current coefficient (e.g., a coefficient currently under processing) possibly in combination with other factors.

Figure 11:
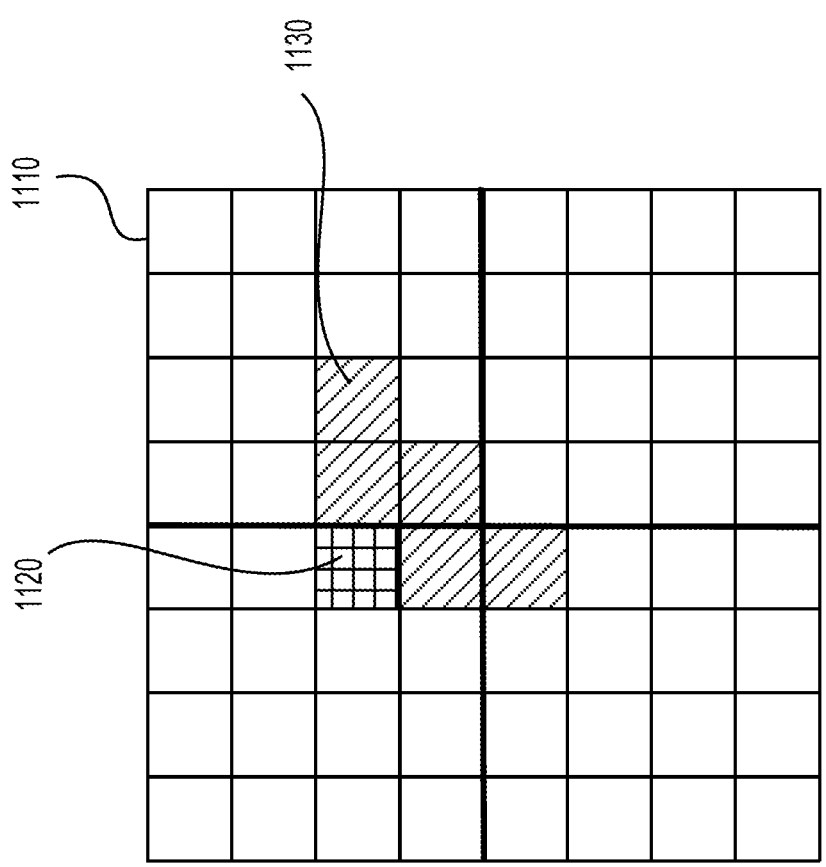
FIG. 11 shows an example of a local template used for context selection for current coefficients.

FIG. 11 shows an example of a local template (1130) used for context selection for current coefficients. The local template (1130) can cover a set of neighboring positions or coefficients of a current coefficient (1120) in a coefficient block (1110). In the FIG. 11 example, the coefficient block (1110) has a size of 8×8 positions, and include coefficient levels at the 64 positions. The coefficient block (1110) is partitioned into 4 sub-blocks each with a size of 4×4 positions. In the FIG. 11 example, the local template (1130) is defined to be a 5 position template covering 5 coefficient levels at the bottom-right side of the current coefficient (1120). When an inverse diagonal scan order is used for multiple passes over the scan positions within the coefficient block (1110), the neighboring positions within the local template (1130) are processed prior to the current coefficient (1120).

During the context modeling, information of the coefficient levels within the local template (1130) can be used to determine a context model. For this purpose, a measure, referred to as a template magnitude, is defined in some embodiments to measure or indicate magnitudes of the transform coefficients or transform coefficient levels within the local template (1130). The template magnitude can then be used as the basis for select the context model.

In one example, the template magnitude is defined to be a sum, denoted by sumAbs1, of partially reconstructed absolute transform coefficient levels inside the local template (1130). A partially reconstructed absolute transform coefficient level can be determined according to bins of the syntax elements, sig_coeff_flag, par_level_flag, and rem_abs_gt1_flag of the respective transform coefficient. These three types of syntax elements are obtained after a first pass over scan positions of a sub-block performed in an entropy encoder or an entropy decoder. In an embodiment, a partially reconstructed absolute transform coefficient level at a position (x, y) can be determined according to:

$$\text{absLevel1}[x][y]=\text{sig\_coeff\_flag}[x][y]+\text{par\_level\_flag}[x][y]+2*\text{rem\_abs\_gt1\_flag}[x][y],\qquad \text{Eq. (1):}$$

where x and y are coordinates with respect to a top-left corner of the coefficient block (1110), while absLevel1[x][y] represents the partially reconstructed absolute transform coefficient level at the position (x, y).

In another example, the template magnitude is defined to be a difference, denoted by tmplCpSum1, between the sum of the partially reconstructed absolute transform coefficient levels and the number, denoted by numSig, of non-zero coefficients in the local template (1130). Thus, the difference can be determined according to:

$$\text{tmplCpSum1}=\text{sumAbs1}-\text{numSig}.\qquad \text{Eq. (2):}$$

In other examples, the template magnitude may be defined in other ways to indicate magnitudes of transform coefficients or transform coefficient levels.

In some embodiments, to exploit a correlation between transform coefficients, the previously coded coefficients covered by a local template shown in FIG. 11 are used in the context selection for the current coefficients, where the position with square cross-hatching (1120) indicates the current transform coefficient position (x, y) and the positions with diagonal cross-hatching indicates its five neighbors. Let AbsLevelPass1[x][y] represent the partially reconstructed absolute levels for coefficient at position (x, y) after the first pass, d represents the diagonal position of the current coefficient (d=x+y), Eq. (2): sumAbs1 represents the sum of partially reconstructed absolute level AbsLevelPass1[x][y] of coefficients covered by local template. The syntax element AbsLevelPass1[x][y] may be computed from the syntax elements sig_coeff_flag[xC][yC], abs_level_gtx_flag[n][0], par_level_flag[n], abs_level_gtx_flag[n][1], where abs_level_gtx_flag[n][0] and abs_level_gtx_flag[n][1] are also known as rem_abs_gt1_flag and rem_abs_gt2 flag respectively for the coefficient at position n in FIG. 10.

Figure 12:
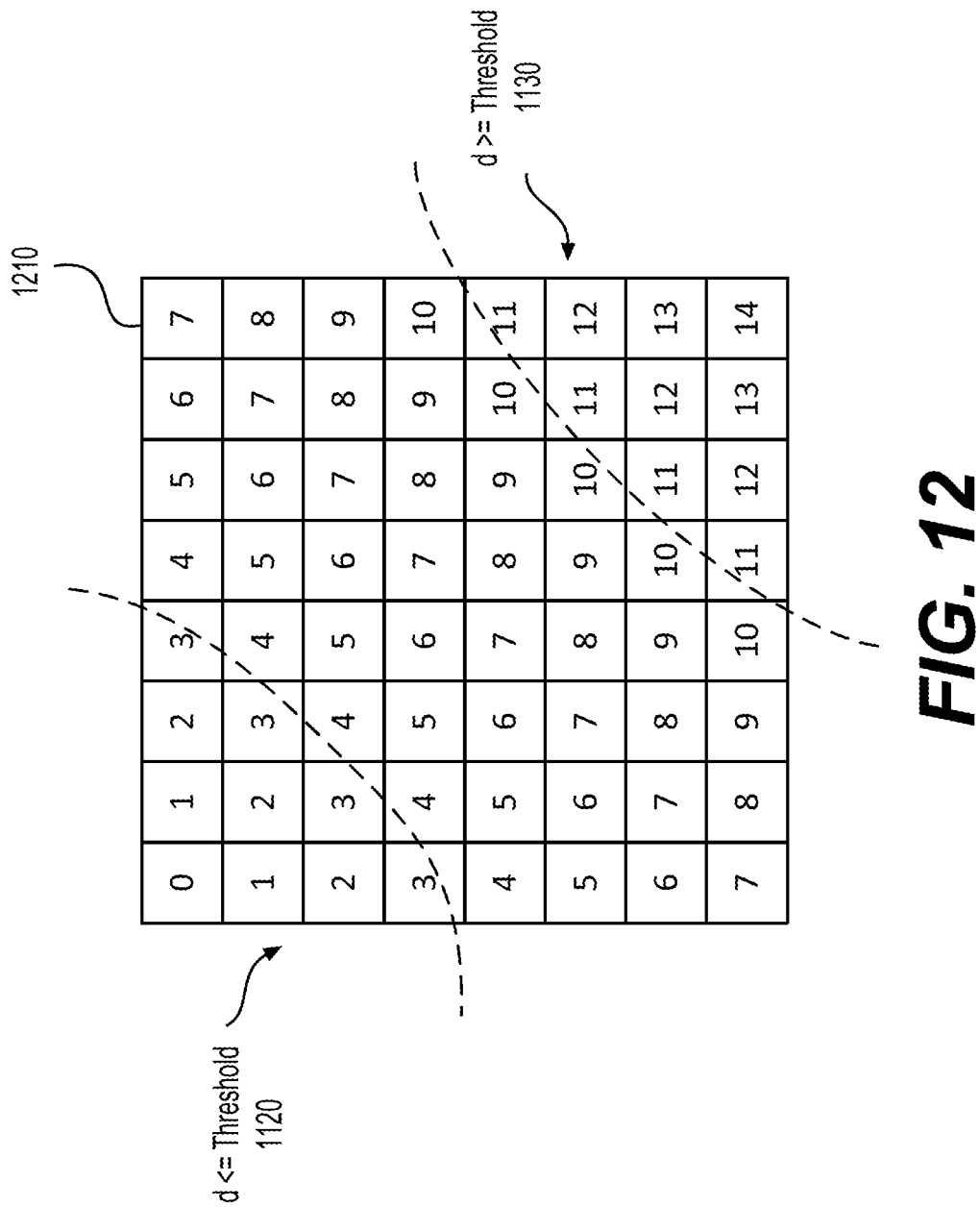
FIG. 12 shows diagonal positions of coefficients or coefficient levels inside a coefficient block.

FIG. 12 shows diagonal positions of coefficients or coefficient levels inside a coefficient block (1210). In an embodiment, the diagonal position of a scan position (x, y) is defined according to:

$$d=x+y,\qquad \text{Eq. (3):}$$

where d represents the diagonal position, and x and y are coordinates of the respective position. The diagonal position, d, of each coefficient can be used to define different frequency regions within the coefficient block (1210) based on one or two diagonal position thresholds. As two examples, a low frequency region (1220) is defined with d<=3, while a high frequency region (1230) is defined with d>=11, as shown in FIG. 12.

Figure 13:
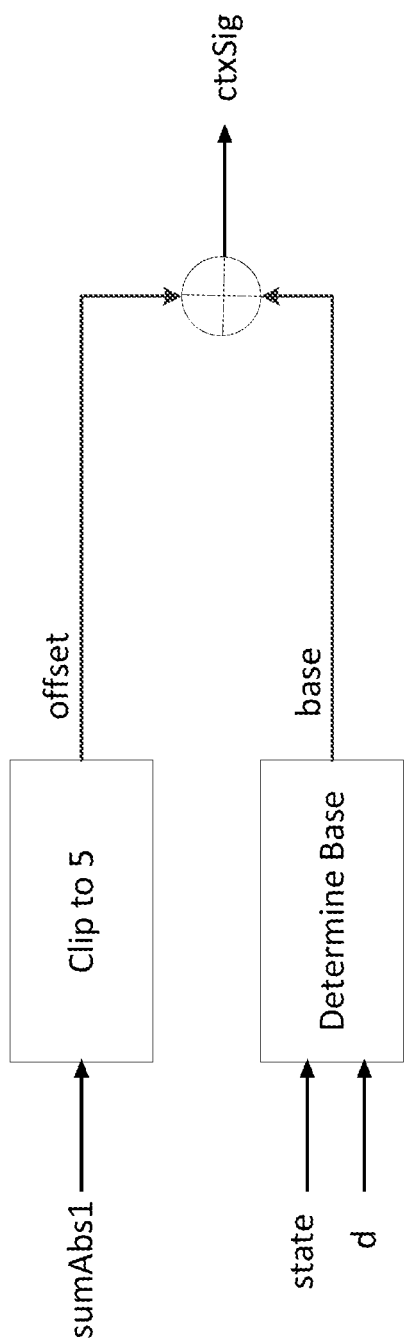
FIG. 13 illustrates a context index calculation for a luma component in accordance with an embodiment.

In some embodiments, when coding sig_coeff_flag[x][y] of the current coefficient, a context model index is selected depending on a value of sumAbs1 and a diagonal position d. More specifically, as shown in FIG. 13 for a Luma component, the context model index is determined according to:

$$\text{offset}=\min(\text{sumAbs1},5)\qquad \text{Eq. (4):}$$

$$\text{base}=18*\max(0,\text{state}-1)+(d<2?12:(d<5?6:0))\qquad \text{Eq. (5):}$$

$$\text{ctxSig}=\text{base}+\text{offset}\qquad \text{Eq. (6):}$$

For a Chroma component, the context model index is determined according to:

$$\text{offset}=\min(\text{sumAbs1},5)\qquad \text{Eq. (7):}$$

$$\text{base}=12*\max(0,\text{state}-1)+(d<2?6:0)\qquad \text{Eq. (8):}$$

$$\text{ctxSig}=\text{base}+\text{offset},\qquad \text{Eq. (9):}$$

where state specifies the scalar quantizer used, and the operators ? and : are defined as in the computer language C. If the dependent quantization is enabled, state is derived using a state transition process. Otherwise, dependent quantization is not enabled, state is equal to 0.

In some examples, the number of context models for coding sig_coeff_flag[x][y] is 54 for Luma and 36 for Chroma. Therefore, the total number of context models for coding sig_coeff_flag[x][y] is 90, which is more than 21% of the 424 context models in standardized context modeling schemes such as VVC Draft 5.

Table 1 illustrates an example of a residual coding syntax. In Table 1, xC corresponds to an x coordinate of a current coefficient in a transform block, and yC corresponds to a y coordinate of the current coefficient in the transform block.

TABLE 1

| | Descriptor |
|---|---|
| residual_coding( x0, y0, log2TbWidth, log2TbHeight, cIdx ) { | |
|   if( ( tu_mts_idx[ x0 ][ y0 ] > 0 \|\| | |
|     ( cu_sbt_flag && log2TbWidth < 6 && log2TbHeight < 6 ) ) | |
|     && cIdx = = 0 && log2TbWidth > 4 ) | |

TABLE 1-continued

| | Descriptor |
|---|---|
| ```
    log2ZoTbWidth = 4
  Else
    log2ZoTbWidth = Min( log2TbWidth, 5 )
  if( tu_mts_idx[ x0 ][ y0 ] > 0 | |
      ( cu_sbt_flag && log2TbWidth < 6 && log2TbHeight < 6 ) )
        && cIdx = = 0 && log2TbHeight > 4 )
    log2ZoTbHeight = 4
  Else
    log2ZoTbHeight = Min( log2TbHeight, 5 )
  if( log2TbWidth > 0 )
    last_sig_coeff_x_prefix
  if( log2TbHeight > 0 )
    last_sig_coeff_y_prefix
  if( last_sig_coeff_x_prefix > 3 )
    last_sig_coeff_x_suffix
  if( last_sig_coeff_y_prefix > 3 )
    last_sig_coeff_y_suffix
  log2TbWidth = log2ZoTbWidth
  log2TbHeight = log2ZoTbHeight
  log2SbW = ( Min( log2TbWidth, log2TbHeight) < 2 ? 1 : 2 )
  log2SbH = log2SbW
  if( log2TbWidth + log2TbHeight > 3 ) {
    if( log2TbWidth < 2 ) {
        log2SbW = log2TbWidth
        log2SbH = 4 − log2SbW
    } else if( log2TbHeight < 2 ) {
        log2SbH = log2TbHeight
        log2SbW = 4 − log2SbH
    }
  }
  numSbCoeff = 1 << ( log2SbW + log2SbH)
  lastScanPos = numSbCoeff
  lastSubBlock = ( 1 << (
log2TbWidth + log2TbHeight − ( log2SbW + log2SbH ) ) ) − 1
  do {
    if( lastScanPos = = 0 ) {
      lastScanPos = numSbCoeff
      lastSubBlock− −
    }
    lastScanPos− −
    xS =
DiagScanOrder[ log2TbWidth − log2SbW ][ log2TbHeight − log2SbH ]
              [ lastSubBlock ][ 0 ]
    yS =
DiagScanOrder[ log2TbWidth − log2SbW ][ log2TbHeight − log2SbH ]
              [ lastSubBlock ][ 1 ]
    xC = ( xS << log2SbW ) +
DiagScanOrder[ log2SbW ][ log2SbH ][ lastScanPos ][ 0 ]
    yC = ( yS << log2SbH ) +
DiagScanOrder[ log2SbW ][ log2SbH ][ lastScanPos ][ 1 ]
  } while( ( xC != LastSignificantCoeffX ) | | ( yC !=
LastSignificantCoeffY ) )
  QState = 0
  for( i = lastSubBlock; i >= 0; i− − ) {
    startQStateSb = QState
    xS =
DiagScanOrder[ log2TbWidth − log2SbW ][ log2TbHeight − log2SbH ]
              [ i ][ 0 ]
    yS =
DiagScanOrder[ log2TbWidth − log2SbW ][ log2TbHeight − log2SbH ]
              [ i ][ 1 ]
    inferSbDcSigCoeffFlag = 0
    if( ( i < lastSubBlock ) && ( i > 0 ) ) {
      coded_sub_block_flag[ xS ][ yS ]
      inferSbDcSigCoeffFlag = 1
    }
    firstSigScanPosSb = numSbCoeff
    lastSigScanPosSb = −1
    remBinsPass1 = ( ( log2SbW + log2SbH ) < 4 ? 8 : 32 )
    firstPosMode0 = ( i = = lastSubBlock ? lastScanPos : numSbCoeff − 1 )
    firstPosMode1 = −1
    for( n = firstPosMode0; n >= 0 && remBinsPass1 >= 4; n− − ) {
      xC = ( xS << log2SbW ) +
DiagScanOrder[ log2SbW ][ log2SbH ][ n ][ 0 ]
      yC = ( yS << log2SbH ) +
DiagScanOrder[ log2SbW ][ log2SbH ][ n ][ 1 ]
      if( coded_sub_block_flag[ xS ][ yS ] && ( n > 0 | |
!inferSbDcSigCoeffFlag ) &&
``` | ae(v)<br><br>ae(v)<br><br>ae(v)<br><br>ae(v)<br><br><br><br><br><br><br><br><br><br><br><br><br><br><br><br><br><br><br><br><br><br><br><br><br><br><br><br><br><br><br><br><br><br><br><br><br><br><br><br>ae(v) |

TABLE 1-continued

| | Descriptor |
|---|---|
| ( xC != LastSignificantCoeffX \|\| yC != Last SignificantCoeffY ) ) { | |
|     sig_coeff_flag[ xC ][ yC ] | ae(v) |
|     remBinsPass1– – | |
|     if( sig_coeff_flag[ xC ][ yC ] ) | |
|       inferSbDcSigCoeffFlag = 0 | |
| } | |
| if( sig_coeff_flag[ xC ][ yC ] ) { | |
|     abs_level_gtx_flag[ n ][ 0 ] | ae(v) |
|     remBinsPass1– – | |
|     if( abs_level_gtx_flag[ n ][ 0 ] ) { | |
|       par_level_flag[ n ] | ae(v) |
|       remBinsPass1– – | |
|       abs_level_gtx_flag[ n ][ 1 ] | ae(v) |
|       remBinsPass1– – | |
|     } | |
|     if( lastSigScanPosSb = = –1) | |
|       lastSigScanPosSb = n | |
|     firstSigScanPosSb = n | |
| } | |
| AbsLevelPass1[ xC ][ yC ] = sig_coeff_flag[ xC ][ yC ] + par_level_flag[ n ] + | |
|         abs_level_gtx_flag[ n ][ 0 ] + 2 * abs_level_gtx_flag[ n ][ 1 ] | |
| if( dep_quant_enabled_flag) | |
|     QState = QStateTransTable[ QState ][ AbsLevelPass1[ xC ][ yC ] & 1 ] | |
| if( remBinsPass1 < 4 ) | |
|     firstPosMode1 = n – 1 | |
| } | |
| for( n = numSbCoeff – 1; n >= firstPosMode1; n– –) { | |
|     xC = ( xS << log2SbW) + DiagScanOrder[ log2SbW ][ log2SbH ][ n ][ 0 ] | |
|     yC = ( yS << log2SbH ) + DiagScanOrder[ log2SbW ][ log2SbH ][ n ][ 1 ] | |
|     if( abs_level_gtx_flag[ n ][ 1 ] ) | |
|       abs_remainder[ n ] | ae(v) |
|     AbsLevel[ xC ][ yC ] = AbsLevelPass1[ xC ][ yC ] +2* abs_remainder[ n ] | |
| } | |
| for( n = firstPosMode1; n >= 0; n– –) { | |
|     xC = ( xS << log2SbW) + DiagScanOrder[ log2SbW ][ log2SbH ][ n ][ 0 ] | |
|     yC = ( yS << log2SbH ) + DiagScanOrder[ log2SbW ][ log2SbH ][ n ][ 1 ] | |
|     dec_abs_level[ n ] | ae(v) |
|     if(AbsLevel[ xC ][ yC ] > 0 ) | |
|       firstSigScanPosSb = n | |
|     if( dep_quant_enabled_flag) | |
|       QState = QStateTransTable[ QState ][ AbsLevel[ xC ][ yC ] & 1 | |
| } | |
| if( dep_quant_enabled_flag \|\| !sign_data_hiding_enabled_flag ) | |
|     signHidden = 0 | |
| Else | |
|     signHidden = ( lastSigScanPosSb – firstSigScanPosSb > 3 ? 1 : 0 ) | |
| for( n = numSbCoeff – 1; n >= 0; n– – ) { | |
|     xC = ( xS << log2SbW) + DiagScanOrder[ log2SbW ][ log2SbH ][ n ][ 0 ] | |
|     yC = ( yS << log2SbH ) + DiagScanOrder[ log2SbW ][ log2SbH ][ n ][ 1 ] | |
|     if( ( AbsLevel[ xC ][ yC ] > 0 ) && | |
|       ( !signHidden \|\| ( n != firstSigScanPosSb ) ) ) | |
|       coeff_sign_flag[ n ] | ae(v) |
| } | |
| if( dep_quant_enabled_flag) { | |
|     QState = startQStateSb | |
|     for( n = numSbCoeff – 1; n >= 0; n– – ) { | |
|       xC = ( xS << log2SbW) + DiagScanOrder[ log2SbW ][ log2SbH ][ n ][ 0 ] | |
|       yC = ( yS << log2SbH ) + DiagScanOrder[ log2SbW ][ log2SbH ][ n ][ 1 ] | |
|       if( AbsLevel[ xC ][ yC ] > 0) | |
|         TransCoeffLevel[ x0 ][ y0 ][ cIdx ][ xC ][ yC ] = | |
|           ( 2 * AbsLevel[ xC ][ yC ] – ( QState > 1 ? 1 : 0 ) ) * | |
|           ( 1 – 2 * coeff_sign_flag[ n ] ) | |
|       QState = QStateTransTable[ QState ][ par_level_flag[ n ] ] | |
| } else { | |
|     sumAbsLevel = 0 | |
|     for( n = numSbCoeff – 1; n >= 0; n– –) { | |

TABLE 1-continued

Descriptor

```
        xC = ( xS << log2SbW ) +
DiagScanOrder[ log2SbW ][ log2SbH ][ n ][ 0 ]
        yC = ( yS << log2SbH ) +
DiagScanOrder[ log2SbW ][ log2SbH ][ n ][ 1 ]
        if( AbsLevel[ xC ][ yC ] > 0 ) {
            TransCoeffLevel[ x0 ][ y0 ][ cIdx ][ xC ][ yC ] =
                AbsLevel[ xC ][ yC ] * ( 1 − 2 * coeff_sign_flag[ n ] )
            if( signHidden ) {
                sumAbsLevel += AbsLevel[ xC ][ yC ]
                if( ( n = = firstSigScanPosSb ) && ( sumAbsLevel % 2 ) = =
1 ) )
                    TransCoeffLevel[ x0 ][ y0 ][ cIdx ][ xC ][ yC ] =
                        −TransCoeffLevel[ x0 ][ y0 ][ cIdx ][ xC ][ yC ]
                }
            }
        }
    }
  }
}
```

When the number of context models increases, the hardware and software complexity also increases. Therefore, it is desired to reduce the number of context models without sacrificing coding efficiency. Particularly, it is desired to reduce the number of context models for the coding for transform coefficient significance since it is more than 21% of the 424 context models in standardized context modeling schemes in VVC Draft 5.

The embodiments of the present disclosure may be used separately or combined in any order. Further, each of the methods, encoder and decoder according to the embodiments of the present disclosure may be implemented by processing circuitry (e.g., one or more processors or one or more integrated circuits). In one example, the one or more processors execute a program that is stored in a non-transitory computer-readable medium. According to embodiments of the present disclosure, the term block may be interpreted as a prediction block, a coding block, or a coding unit (i.e., CU).

According to some embodiments, a region is defined as a set of connected transform coefficient positions. For example, a region is a set of a transform coefficient positions (x, y) such that $d_0 \leq x+y < d_1$ for some non-negative integer $d_0$ and $d_1$ called position thresholds. Embodiments of the present disclosure can be applied to entropy coding techniques of a transform coefficient significant flag (sig_coeff_flag) with the following parameters:

(i) N is the number of context models per region. In one example implementation, N is equal to 4. In another example implementation, N is equal to 5.
(ii) $d_{0Y}$ and $d_{1Y}$ are the diagonal position thresholds for Luma regions. In one example implementation, $d_{0Y}$ is 2 and $d_{1Y}$ is 5.
(iii) $d_{0C}$ is a diagonal position threshold for Chroma regions. In one example implementation, $d_{0C}$ is 2.
(iv) f(x) is a monotonic non-decreasing function which maps from the set of non-negative integer to the set of non-negative integer.
(v) When N is 5, an implementation of the function f(x) is defined as f(x)=x−(x>>2)
(vi) When N is 4, an implementation of the function f(x) is defined as f(x)=(x+1)>>1

Figure 14:
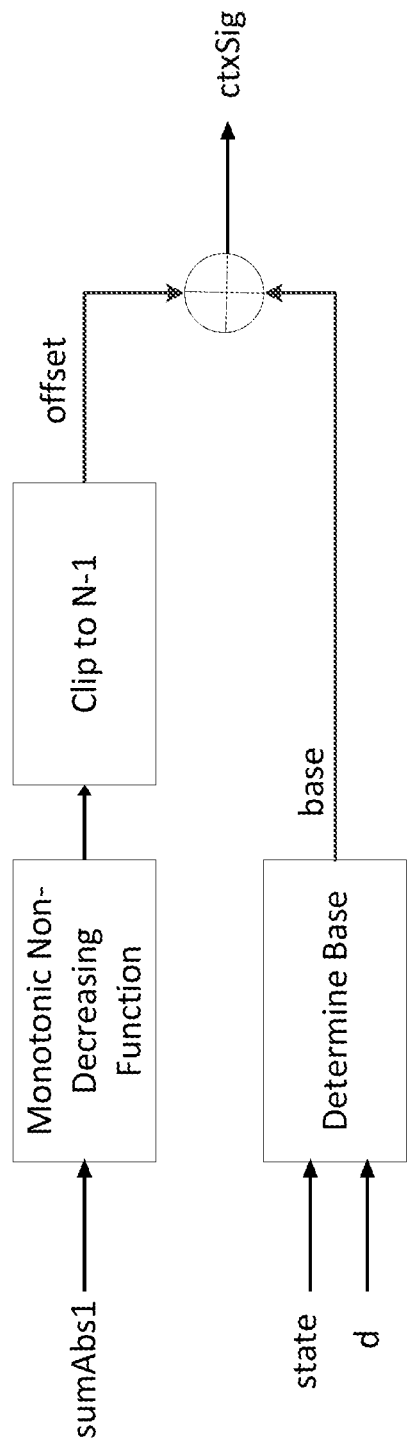
FIG. 14 illustrates a context index calculation for a luma component in accordance with an embodiment.

According to some embodiments, when coding sig_coeff_flag[x][y] of the current coefficient, the context model index is selected depending on a value of sumAbs1 and a diagonal position d. More specifically, as shown in FIG. 14, for a Luma component, the context model index is determined in some embodiments according to:

$$\text{offset} = \min(f(\text{sumAbs1}), N-1) \qquad \text{Eq. (10):}$$

$$\text{base} = 3*N*\max(0, \text{state}-1) + (d<d_{0Y}?2*N:(d<d_{1Y}?N:0)) \qquad \text{Eq. (11):}$$

$$\text{ctxSig} = \text{base} + \text{offset} \qquad \text{Eq. (12):}$$

Figure 15:
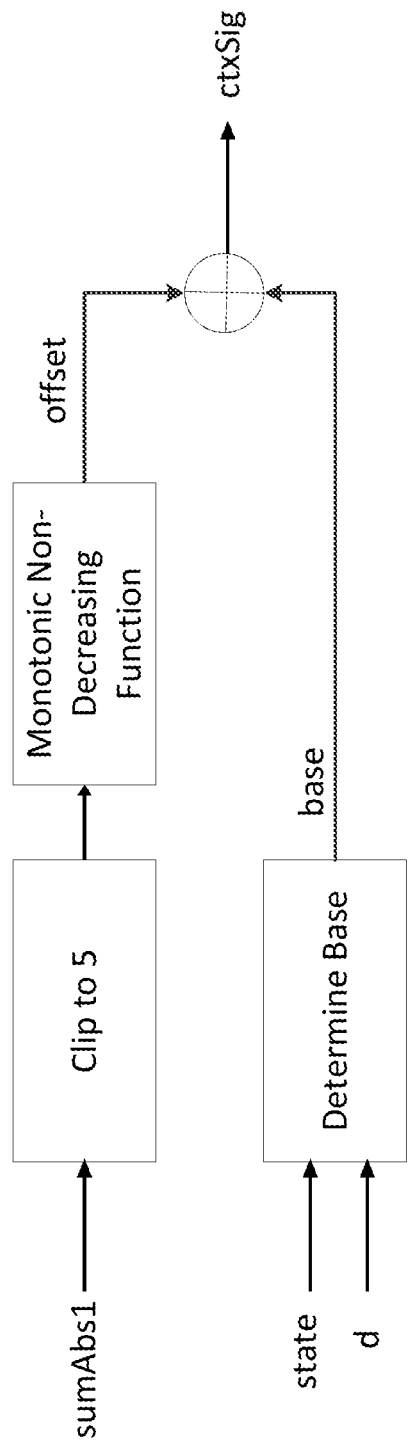
FIG. 15 illustrates a context index calculation for a luma component in accordance with an embodiment.

For a Chroma component, the context model index is determined according to:

$$\text{offset} = \min(f(\text{sumAbs1}), N-1) \qquad \text{Eq. (13):}$$

$$\text{base} = 2*N*\max(0, \text{state}-1) + (d<d_{0C}?N:0) \qquad \text{Eq. (14):}$$

$$\text{ctxSig} = \text{base} + \text{offset} \qquad \text{Eq. (15):}$$

where state specifies the scalar quantizer used if the dependent quantization is enabled and state is derived using a state transition process. If dependent quantization is not enabled, in some examples the state is equal to 0. Furthermore, in some embodiments, as shown in FIG. 15, when N is 4 or 5, the function min(f(sumAbs1), N−1) can also be implemented for lower hardware complexity as f(min(sumAbs1, 5)).

Standardized context modeling schemes in VVC Draft 5 have 90 context models for coding the significance of transform coefficients. In the embodiments of the present disclosure, when N is equal to 5, the number of context model is reduced from 90 to 75, and when N is equal to 4, the number of context model is reduced from 90 to 60.

According, to some embodiments, the monotonic non-decreasing function f(x) of non-negative integer x may be defined as:

$$\Sigma_{i=0}^{M} a_i \times ((x+b_i)>>i), \qquad \text{Eq. (16):}$$

where $\Sigma_{i=0}^{M} a_i/2_i \geq 0$ and, $b_1$ is an integer value. Furthermore, $a_i$ can be 0, 1 or −1 to reduce computation.

According to some embodiments, the context region depends on the diagonal position d, so that the number of context models per region may depend on the diagonal position d to further reduce the number of contexts. For example, the number of context models per region with $(d<d_{0Y})$, $(d_{0Y} \leq d<d_{1Y})$ and $(d_{1Y} \leq d<d_{2Y})$ is $N_1$, $N_2$ and $N_3$, respectively. Particularly, the number of context models may vary based on the value of d. In this case, the context model index may be determined according to:

$$g_1(x)=\min(f_1(x),N_1-1) \qquad \text{Eq. (17):}$$

$$g_2(x)=\min(f_2(x),N_2-1) \qquad \text{Eq. (18):}$$

$$g_3(x)=\min(f_3(x),N_3-1) \qquad \text{Eq. (19):}$$

$$\text{ctxSig}=(N_1+N_2+N_3)*\max(0,\text{state}-1)+(d<d_{0Y}?(N_2+N_3)+g_1(\text{sumAbs1}):(d<d_{1Y}?N_3+g_2(\text{sumAbs1}):g_3(\text{sumAbs1}))), \qquad \text{Eq. (20):}$$

where $f_1(x)$, $f_2(x)$ and $f_3(x)$ are monotonic non-decreasing functions of non-negative integer x. Example values of $N_1$, $N_2$ and $N_3$ can be integer values from 1 to 16. The embodiments including Eqs. (17)-(20) provide more flexibility by reducing the number of contexts with the same bitrate.

An alternative embodiment of the present disclosure can be applied to entropy coding techniques of a transform coefficient significant flag with the following parameters:

(i) N is the number of context models per region. In this implementation N is equal to 4.
(ii) $d_{0Y}$ is the diagonal position threshold for Luma regions. In this implementation, $d_{0Y}$ is 5.
(iii) $d_{0C}$ is the diagonal position threshold for Chroma regions. In this implementation, $d_{0C}$ is 2.
(iv) When N is 4, the function f(x) of non-negative integer x is defined as $f(x)=(x+1)>>1$ According to some embodiments, when coding sig_coeff_flag[x][y] of the current coefficient, the context model index is selected depending on sumAbs1 and diagonal position d, where for a Luma component, the context model index is determined according to:

$$\text{offset}=\min(f(\text{sumAbs1}),N-1) \qquad \text{Eq. (21):}$$

$$\text{base}=2*N*\max(0,\text{state}-1)+(d<d_{0Y}?N:0) \qquad \text{Eq. (22):}$$

$$\text{ctxSig}=\text{base}+\text{offset} \qquad \text{Eq. (23):}$$

For a Chroma component, the context model index is determined according to:

$$\text{offset}=\min(f(\text{sumAbs1}),N-1) \qquad \text{Eq. (24):}$$

$$\text{base}=2*N*\max(0,\text{state}-1)+(d<d_{0C}?N:0) \qquad \text{Eq. (25):}$$

$$\text{ctxSig}=\text{base}+\text{offset} \qquad \text{Eq. (26):}$$

where state specifies the scalar quantizer used if the dependent quantization is enabled and state is derived using a state transition process. Otherwise, dependent quantization is not enabled, state is equal to 0.

In some embodiments, the function min(f(sumAbs1), N-1) can also be implemented for lower hardware complexity as f(min(sumAbs1, 5)).

Standardized context model schemes in VVC Draft 5 have 90 context models for coding the significance of transform coefficients. In the previously disclosed alternative embodiment (i.e., Eqs. (21)-(26)), when N equals to 4, the number of context models is reduced from 90 to 48.

Figure 16:
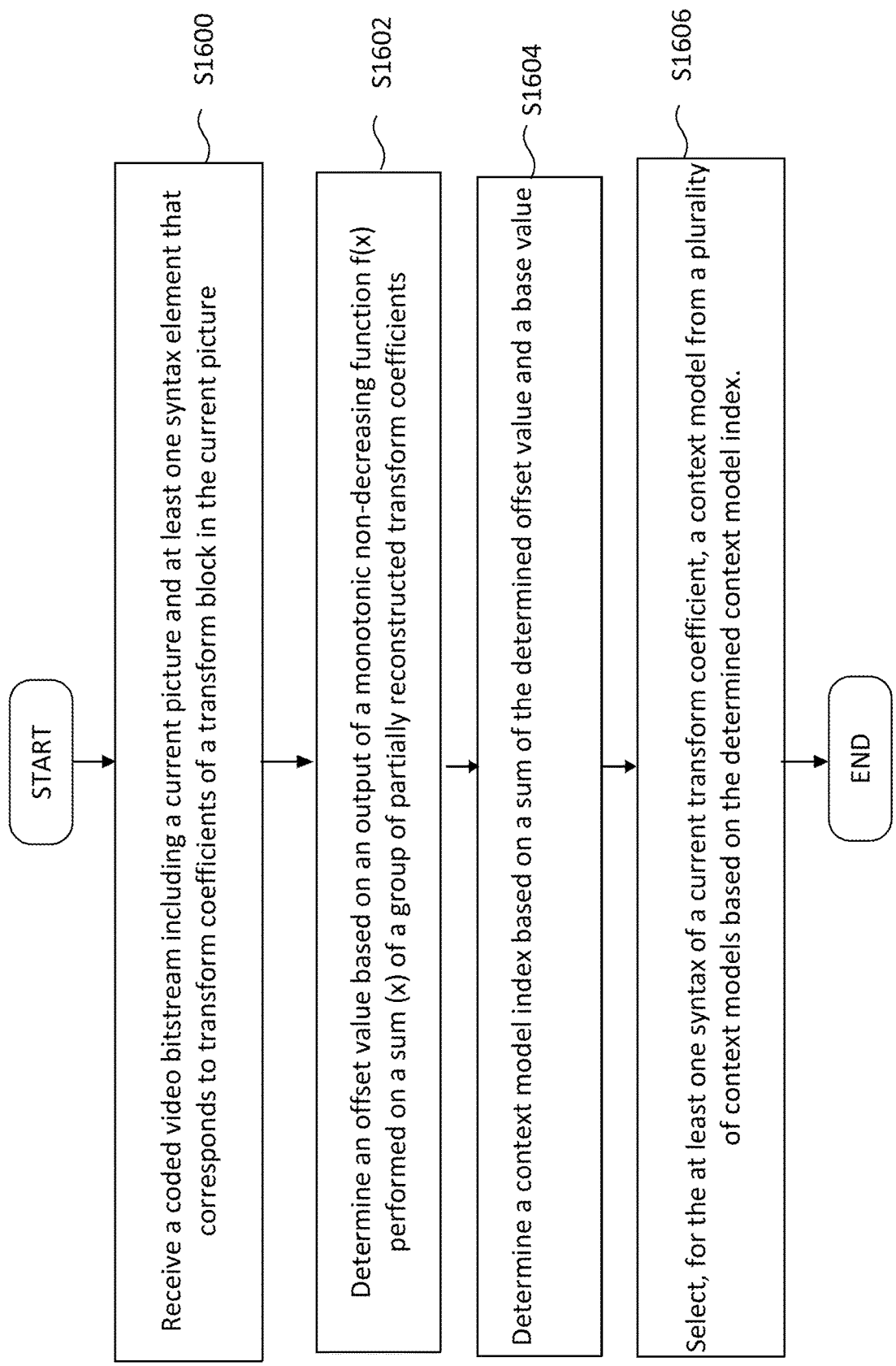
FIG. 16 shows a flow chart outlining an entropy decoding process in accordance with an embodiment.

FIG. 16 illustrates an embodiment of a process performed by a decoder such as video decoder (710). The process may start at step (S1600) where a coded video bitstream including a current picture and at least one syntax element that corresponds to transform coefficients of a transform block in the current picture. As an example, the at least one syntax may be sig_coeff_flag. The process proceeds to step (S1602) where an offset value is determined based on an output of a monotonic non-decreasing function f(x) performed on a sum(x) of a group of partially reconstructed transform coefficients. The process proceeds to step (S1604) where a context model index is determined based on a sum of the determined offset value and a base value. As an example, the context model index may be determined in accordance with the process illustrated in one of FIGS. 14 and 15 or the above disclosed alternative embodiment (i.e., Eqs. (21)-(26)). The process proceeds to step (S1606) where for the at least one syntax of a current transform coefficient, a context model from a plurality of context models based on the determined context model index is selected.

Figure 17:
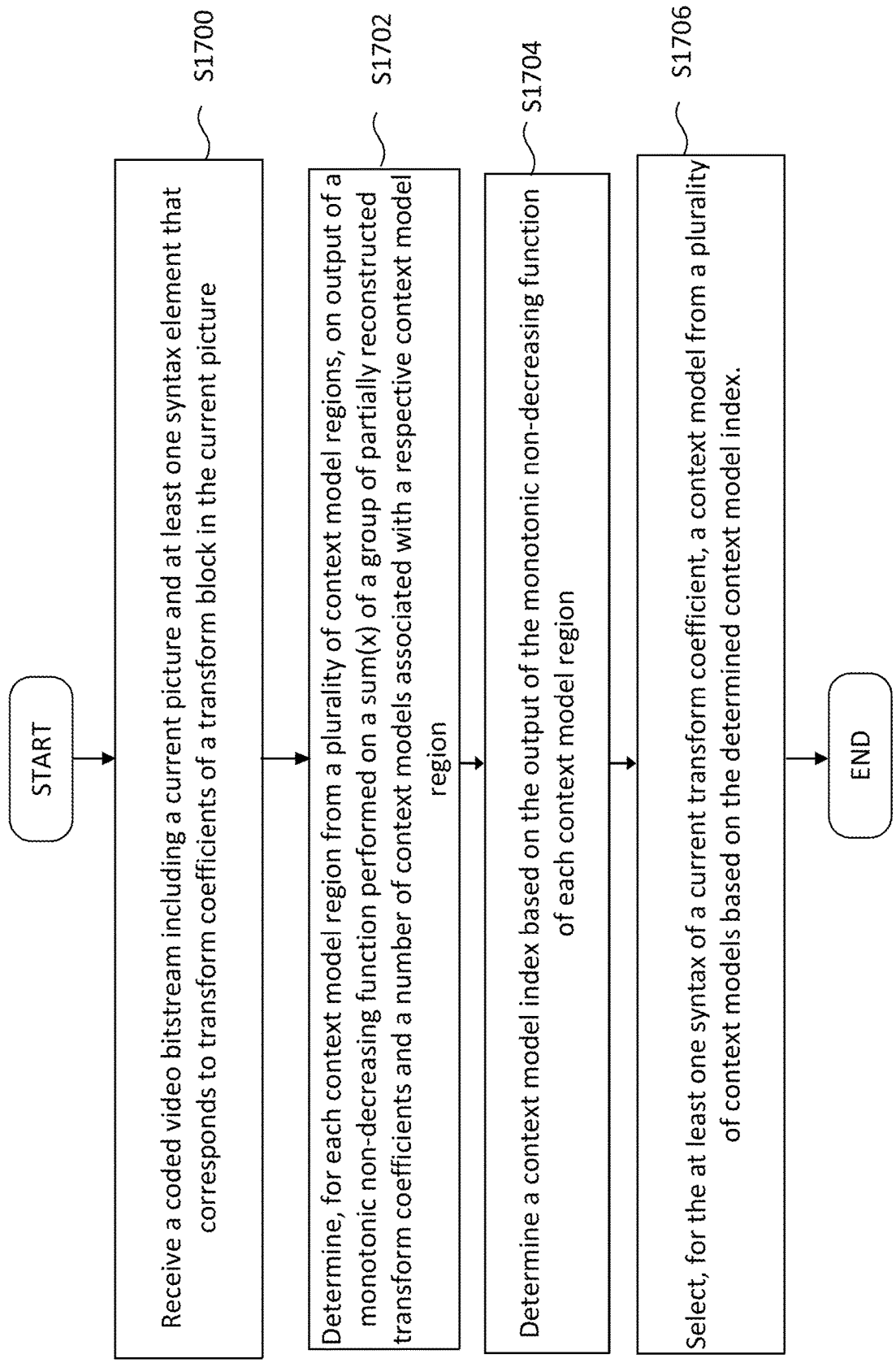
FIG. 17 shows a flow chart outlining an entropy decoding process in accordance with an embodiment.

FIG. 17 illustrates an embodiment of a process performed by a decoder such as video decoder (710). The process may start at step (S1700) where a coded video bitstream including a current picture and at least one syntax element that corresponds to transform coefficients of a transform block in the current picture. As an example, the at least one syntax may be sig_coeff_flag. The process proceeds to step (S1702) where, for each context model region from a plurality of context model regions, an output of a monotonic non-decreasing function performed on a sum(x) of a group of partially reconstructed transform coefficients and a number of context models associated with a respective context model region. For example, functions $g_1(x)=\min(f_1(x)$, $g_2(x)=\min(f_2(x), N_2-1)$, and $g_3(x)=\min(f_3(x), N_3-1)$ disclosed above may be used for a respective context model region, where the number of context models per region (i.e., $N_1, N_2, N_3$) varies based on a distance of a current coefficient from a top left corner the transform block. The process proceeds to step (S1704) where a context model index is determined based on the output of the monotonic non-decreasing function of each context model region. The process proceeds to step (S1706) where for the at least one syntax of a current transform coefficient, a context model from a plurality of context models based on the determined context model index is selected.

The techniques described above, can be implemented as computer software using computer-readable instructions and physically stored in one or more computer-readable media. For example, FIG. 18 shows a computer system (1800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 18:
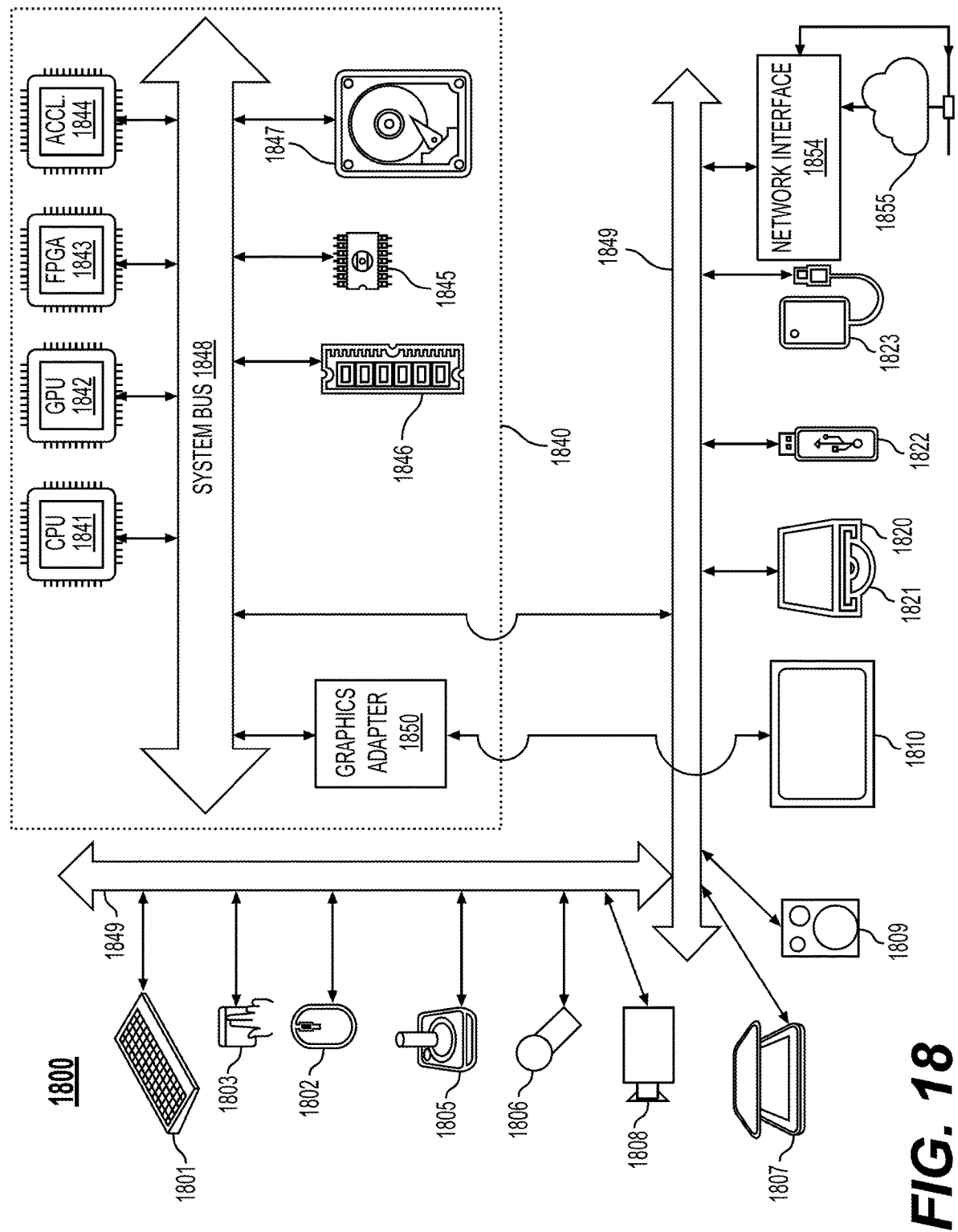
FIG. 18 is a schematic illustration of a computer system in accordance with an embodiment.

The components shown in FIG. 18 for computer system (1800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1800).

Computer system (1800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1801), mouse (1802), trackpad (1803), touch screen (1810), data-glove (not shown), joystick (1805), microphone (1806), scanner (1807), camera (1808).

Computer system (1800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1810), data-glove (not shown), or joystick (1805), but there can also be tactile feedback devices that do not serve as input devices), audio output devices (such as: speakers (1809), headphones (not depicted)), visual output devices (such as screens (1810) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1800) can also include human accessible storage devices and their associated media such as optical media including CD/DVD ROM/RW (1820) with CD/DVD or the like media (1821), thumb-drive (1822), removable hard drive or solid state drive (1823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1800) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1849) (such as, for example USB ports of the computer system (1800)); others are commonly integrated into the core of the computer system (1800) by attachment to a system bus as described below (for example Ethernet interface into a PC computer system or cellular network interface into a smartphone computer system). Using any of these networks, computer system (1800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1840) of the computer system (1800).

The core (1840) can include one or more Central Processing Units (CPU) (1841), Graphics Processing Units (GPU) (1842), specialized programmable processing units in the form of Field Programmable Gate Areas (FPGA) (1843), hardware accelerators for certain tasks (1844), and so forth. These devices, along with Read-only memory (ROM) (1845), Random-access memory (1846), internal mass storage such as internal non-user accessible hard drives, SSDs, and the like (1847), may be connected through a system bus (1848). In some computer systems, the system bus (1848) can be accessible in the form of one or more physical plugs to enable extensions by additional CPUs, GPU, and the like. The peripheral devices can be attached either directly to the core's system bus (1848), or through a peripheral bus (1849). Architectures for a peripheral bus include PCI, USB, and the like.

CPUs (1841), GPUs (1842), FPGAs (1843), and accelerators (1844) can execute certain instructions that, in combination, can make up the aforementioned computer code. That computer code can be stored in ROM (1845) or RAM (1846). Transitional data can also be stored in RAM (1846), whereas permanent data can be stored for example, in the internal mass storage (1847). Fast storage and retrieve to any of the memory devices can be enabled through the use of cache memory, that can be closely associated with one or more CPU (1841), GPU (1842), mass storage (1847), ROM (1845), RAM (1846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1800), and specifically the core (1840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1840) that are of non-transitory nature, such as core-internal mass storage (1847) or ROM (1845). The software implementing various embodiments of the present disclosure can be stored in such devices and executed by core (1840). A computer-readable medium can include one or more memory devices or chips, according to particular needs. The software can cause the core (1840) and specifically the processors therein (including CPU, GPU, FPGA, and the like) to execute particular processes or particular parts of particular processes described herein, including defining data structures stored in RAM (1846) and modifying such data structures according to the processes defined by the software. In addition or as an alternative, the computer system can provide functionality as a result of logic hardwired or otherwise embodied in a circuit (for example: accelerator (1844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC))

storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

(1) A method of video decoding performed in a video decoder, the method including receiving a coded video bitstream including a current picture and at least one syntax element that corresponds to transform coefficients of a transform block in the current picture; determining an offset value based on an output of a monotonic non-decreasing f(x) function performed on a sum (x) of a group of partially reconstructed transform coefficients; determining a context model index based on a sum of the determined offset value and a base value; and selecting, for the at least one syntax of a current transform coefficient, a context model from a plurality of context models based on the determined context model index.

(2) The method of feature (1), in which one of the base value and offset value is determined based on a number of context models included in the plurality of context models.

(3) The method according to feature (2), the method further including: determining whether dependent quantization is enabled for the current coefficient, and in response to the determination that dependent quantization is enabled for the current coefficient, the base value is based on a state of a quantizer.

(4) The method according to feature (3), in which the current coefficient is located in a luma region, and the base value is based on a comparison of a distance of the current coefficient from a top left corner the transform block with a first diagonal position threshold.

(5) The method according to feature (4), in which the base value is further based on a comparison of the distance with a second diagonal position threshold.

(6) The method according to feature (3), in which the current coefficient is located in a chroma region, and the base value is based on a comparison of a distance of the current coefficient from a top left corner the transform block with a first diagonal position threshold.

(7) The method according to any one of features (1)-(6), in which the monotonic non-decreasing function is defined as $x-(x>>2)$.

(8) The method according to any one of features (1)-(6), in which the monotonic non-decreasing function is defined as $(x+1)>>1$.

(9) The method according to any one of features (1)-(8), in which the current coefficient and the group of partially reconstructed transform coefficients form a template that constitutes a contiguous set of transform coefficients.

(10) The method according to any one of features (1)-(9), in which the at least one syntax element is a transform coefficient significant flag (sig_coeff_flag).

(11) The method according to any one of features (1)-(10), in which the bit stream includes a plurality of syntax elements that include the at least one syntax element, and in which the sum (x) of the group of partially reconstructed transform coefficients is based on one or more syntax elements from the plurality of syntax elements.

(12) A method of video decoding performed in a video decoder, the method including: receiving a coded video bitstream including a current picture and at least one syntax element that corresponds to transform coefficients of a transform block in the current picture; determining, for each context model region from a plurality of context model regions, an output of a monotonic non-decreasing function performed on a sum (x) of a group of partially reconstructed transform coefficients and a number of context models associated with a respective context model region; determining a context model index based on the output of the monotonic non-decreasing function of each context model region; and selecting, for the at least one syntax of a current transform coefficient, a context model from a plurality of context models based on the determined context model index.

(13) The method according to feature (12), in which the determining of the context model index is further based on a comparison of a distance of the current coefficient from a top left corner the transform block with a first diagonal position threshold and a second diagonal position threshold.

(14) The method according to feature (12), in which the determining of the context model index is further based on a comparison of a distance of the current coefficient from a top left corner the transform block with a first diagonal position.

(15) A video decoder for video decoding, including processing circuitry configured to: receive a coded video bitstream including a current picture and at least one syntax element that corresponds to transform coefficients of a transform block in the current picture, determine an offset value based on an output of a monotonic non-decreasing f(x) function performed on a sum (x) of a group of partially reconstructed transform coefficients, determine a context model index based on a sum of the determined offset value and a base value, and select, for the at least one syntax of a current transform coefficient, a context model from a plurality of context models based on the determined context model index.

(16) The video decoder according to feature (15), in which one of the base value and offset value is determined based on a number of context models included in the plurality of context models.

(17) The video decoder according to feature (16), in which the processing circuitry is further configured to: determine whether dependent quantization is enabled for the current coefficient, and in response to the determination that dependent quantization is enabled for the current coefficient, the base value is based on a state of a quantizer.

(18) The video decoder according to feature (17), in which the current coefficient is located in a luma region, and the base value is based on a comparison of a distance of the current coefficient from a top left corner the transform block with a first diagonal position threshold.

(19) The video decoder according to feature (18), in which the base value is further based on a comparison of the distance with a second diagonal position threshold.

(20) A video decoder apparatus for video decoding including processing circuitry configured to: receive a coded video bitstream including a current picture and at least one syntax element that corresponds to transform coefficients of a transform block in the current picture, determine, for each context model region from a plurality of context model regions, an output of a monotonic non-decreasing function performed on a sum (x) of a group of partially reconstructed transform coefficients and a number of context models associated with a respective context model region, determine a context model index based on the output of the monotonic non-decreasing function of each context model region, and select, for the at least one syntax of a current transform coefficient, a context model from a plurality of context models based on the determined context model index.

What is claimed is:

1. A method of video decoding performed in a video decoder, the method comprising:
   receiving a coded video bitstream including a current picture and at least one syntax element that corresponds to transform coefficients of a transform block in the current picture;
   determining an offset value based on an output of a monotonically non-decreasing function performed on a sum of a group of partially reconstructed transform coefficients;
   determining a context model index based on a sum of the determined offset value and a base value; and
   selecting, for the at least one syntax of a current transform coefficient, a context model from a plurality of context models based on the determined context model index,
   wherein one of the base value and the offset value is determined based on a number of context models included in the plurality of context models.

2. The method according to claim 1, the method further comprising:
   determining whether dependent quantization is enabled for the current transform coefficient, and
   in response to the determination that dependent quantization is enabled for the current transform coefficient, the base value is based on a state of a quantizer.

3. The method according to claim 2, wherein the current transform coefficient is located in a luma region, and the base value is based on a comparison of a distance of the current transform coefficient from a top left corner of the transform block with a first diagonal position threshold.

4. The method according to claim 3, wherein the base value is further based on a comparison of the distance with a second diagonal position threshold.

5. The method according to claim 2, wherein the current transform coefficient is located in a chroma region, and the base value is based on a comparison of a distance of the current transform coefficient from a top left corner of the transform block with a first diagonal position threshold.

6. The method according to claim 1, wherein the monotonically non-decreasing function is defined as $x-(x>>2)$.

7. The method according to claim 1, wherein the monotonically non-decreasing function is defined as $(x+1)>>1$.

8. The method according to claim 1, wherein the current transform coefficient and the group of partially reconstructed transform coefficients form a template that constitutes a contiguous set of transform coefficients.

9. The method according to claim 1, wherein the at least one syntax element is a transform coefficient significant flag (sig_coeff_flag).

10. The method of claim 1, wherein the bitstream includes a plurality of syntax elements that include the at least one syntax element, and wherein the sum of the group of partially reconstructed transform coefficients is based on one or more syntax elements from the plurality of syntax elements.

11. A video decoder for video decoding, comprising:
   processing circuitry configured to:
      receive a coded video bitstream including a current picture and at least one syntax element that corresponds to transform coefficients of a transform block in the current picture,
      determine an offset value based on an output of a monotonically non-decreasing function performed on a sum of a group of partially reconstructed transform coefficients,
      determine a context model index based on a sum of the determined offset value and a base value, and
      select, for the at least one syntax of a current transform coefficient, a context model from a plurality of context models based on the determined context model index,
      wherein one of the base value and the offset value is determined based on a number of context models included in the plurality of context models.

12. The video decoder according to claim 11, wherein the processing circuitry is further configured to:
   determine whether dependent quantization is enabled for the current transform coefficient, and
   in response to the determination that dependent quantization is enabled for the current transform coefficient, the base value is based on a state of a quantizer.

13. The video decoder according to claim 12, wherein the current transform coefficient is located in a luma region, and the base value is based on a comparison of a distance of the current transform coefficient from a top left corner of the transform block with a first diagonal position threshold.

14. The video decoder according to claim 13, wherein the base value is further based on a comparison of the distance with a second diagonal position threshold.

\* \* \* \* \*